US010825076B2

(12) United States Patent
Rajkhowa et al.

(10) Patent No.: US 10,825,076 B2
(45) Date of Patent: Nov. 3, 2020

(54) SYSTEMS TO FULFILL A PICKED SALES ORDER AND RELATED METHODS THEREFOR

(71) Applicant: WAL-MART STORES, INC., Bentonville, AR (US)

(72) Inventors: Pratosh Deepak Rajkhowa, Bangalore (IN); Ameya Ajay Shendre, Bangalore (IN); Pavan Kumar Raichur Rajoli, Bangalore (IN); Shekhar Gupta, Bangalore (IN); Vidyanand Krishnan, Sunnyvale, CA (US)

(73) Assignee: WALMART APOLLO LLC, Bentonville, AR (US)

( * ) Notice: Subject to any disclaimer, the term of this patent is extended or adjusted under 35 U.S.C. 154(b) by 620 days.

(21) Appl. No.: 15/588,363

(22) Filed: May 5, 2017

(65) Prior Publication Data
US 2018/0300798 A1 Oct. 18, 2018

Related U.S. Application Data

(60) Provisional application No. 62/486,275, filed on Apr. 17, 2017, provisional application No. 62/486,254, (Continued)

(51) Int. Cl.
G06Q 30/00 (2012.01)
G06Q 30/06 (2012.01)
G06Q 10/08 (2012.01)

(52) U.S. Cl.
CPC ....... *G06Q 30/0635* (2013.01); *G06Q 10/083* (2013.01)

(58) Field of Classification Search
CPC .................. G06Q 10/083; G06Q 30/0635
(Continued)

(56) References Cited

U.S. PATENT DOCUMENTS 6,246,998 B1 6/2001 Matsumori
7,147,154 B2 12/2006 Myers et al.
(Continued)

FOREIGN PATENT DOCUMENTS

CN 101778045 A 7/2010
CN 101964799 A 2/2011
(Continued)

OTHER PUBLICATIONS

Sharma et al., "A proposed hybrid storage assignment framework: a case study," International Journal of Productivity and Performance Management 64.6: 870-892. Emerald Group Publishing Limited. Dialog #2115757331 20pgs (Year: 2015).*

*Primary Examiner* — Robert M Pond
(74) *Attorney, Agent, or Firm* — Bryan Cave Leighton Paisner LLP

(57) ABSTRACT

Some embodiments include a system. The system can include one or more processors and one or more non-transitory memory storage devices storing computer instructions configured to run on the processor(s) and perform acts including: receiving a request for a picked sales order; estimating an estimated fulfillment time interval to make ready the good(s) of the picked sales order for receipt by the customer, wherein estimating the estimated fulfillment time interval to make ready the good(s) of the picked sales order for receipt by the customer comprises evaluating whether the picked sales order is able to be batched in a picked sales order batch using a k-means clustering to minimize a pick walk of the picked sales order batch; determining a receivable clock time at which to promise the good(s) for receipt by the customer; and communicating the receivable clock time to the customer. Other embodiments of related systems and methods are also provided.

20 Claims, 9 Drawing Sheets

Related U.S. Application Data filed on Apr. 17, 2017, provisional application No. 62/486,266, filed on Apr. 17, 2017.

(58) Field of Classification Search
USPC .................................................. 705/26–28
See application file for complete search history.

(56) References Cited

U.S. PATENT DOCUMENTS

| | | | |
|---|---|---|---|
| 7,295,990 | B1 | 11/2007 | Braumoeller et al. |
| 7,747,543 | B1 | 6/2010 | Braumoeller et al. |
| 7,949,686 | B2 | 5/2011 | Chang et al. |
| 8,005,761 | B1 | 8/2011 | Braumoeller et al. |
| 8,121,876 | B1 | 2/2012 | Braumoeller et al. |
| 8,201,737 | B1 | 6/2012 | Palacios Durazo et al. |
| 8,401,914 | B1 | 3/2013 | Kim |
| 8,428,988 | B1 | 4/2013 | Braumoeller et al. |
| 8,818,836 | B1 | 8/2014 | Braumoeller et al. |
| 9,147,208 | B1 | 9/2015 | Argue et al. |
| 9,466,045 | B1 | 10/2016 | Kumar |
| 9,470,532 | B2 | 10/2016 | Pellow et al. |
| 9,569,745 | B1* | 2/2017 | Ananthanarayanan ..................... G06Q 10/083 |
| 9,626,709 | B2 | 4/2017 | Koch et al. |
| 10,127,514 | B2 | 11/2018 | Napoli |
| 2002/0198756 | A1 | 12/2002 | Ghaisas et al. |
| 2003/0033177 | A1 | 2/2003 | MacGonigle et al. |
| 2003/0177072 | A1 | 9/2003 | Bared |
| 2004/0010437 | A1 | 1/2004 | Kiran et al. |
| 2004/0068443 | A1 | 4/2004 | Hopson et al. |
| 2004/0210621 | A1 | 10/2004 | Antonellis |
| 2005/0278062 | A1 | 12/2005 | Janert et al. |
| 2007/0174144 | A1 | 7/2007 | Borders et al. |
| 2007/0244758 | A1 | 10/2007 | Xie |
| 2007/0250355 | A1 | 10/2007 | Leet et al. |
| 2009/0048878 | A1 | 2/2009 | Metcalf |
| 2009/0157472 | A1 | 6/2009 | Burazin et al. |
| 2009/0281921 | A1 | 11/2009 | Foster et al. |
| 2010/0010902 | A1 | 1/2010 | Casey |
| 2010/0287025 | A1 | 11/2010 | Fletcher et al. |
| 2012/0023034 | A1 | 1/2012 | Lynch et al. |
| 2012/0123674 | A1 | 5/2012 | Perks et al. |
| 2012/0150340 | A1 | 6/2012 | Suess et al. |
| 2012/0330458 | A1 | 12/2012 | Weiss |
| 2013/0030955 | A1 | 1/2013 | David |
| 2013/0231990 | A1 | 9/2013 | Munjal et al. |
| 2013/0332273 | A1 | 12/2013 | Gu et al. |
| 2013/0346204 | A1 | 12/2013 | Wissner-Gross et al. |
| 2014/0003727 | A1 | 1/2014 | Lortz et al. |
| 2014/0040075 | A1 | 2/2014 | Perry et al. |
| 2014/0095350 | A1 | 4/2014 | Carr et al. |
| 2014/0136255 | A1 | 5/2014 | Grabovski et al. |
| 2014/0156553 | A1 | 6/2014 | Leach et al. |
| 2014/0207615 | A1 | 7/2014 | Li et al. |
| 2014/0266616 | A1 | 9/2014 | Jones et al. |
| 2014/0278627 | A1 | 9/2014 | Grabovski et al. |
| 2014/0279294 | A1* | 9/2014 | Field-Darragh ..... G06Q 10/087 705/28 |
| 2014/0324491 | A1 | 10/2014 | Banks et al. |
| 2014/0336814 | A1 | 11/2014 | Moore et al. |
| 2014/0351101 | A1 | 11/2014 | Danelski |
| 2014/0379529 | A1 | 12/2014 | Agasti et al. |
| 2015/0051994 | A1 | 2/2015 | Ward et al. |
| 2015/0170256 | A1 | 6/2015 | Pettyjohn |
| 2015/0206093 | A1 | 7/2015 | Trew et al. |
| 2015/0242918 | A1 | 8/2015 | McCarthy |
| 2015/0278759 | A1 | 10/2015 | Harris et al. |
| 2015/0310447 | A1 | 10/2015 | Shaw |
| 2016/0012391 | A1 | 1/2016 | Burnett |
| 2016/0055452 | A1 | 2/2016 | Qin |
| 2016/0063604 | A1 | 3/2016 | Shaffer et al. |
| 2016/0071056 | A1 | 3/2016 | Ellison et al. |
| 2016/0092969 | A1 | 3/2016 | Gopalsamy et al. |
| 2016/0148300 | A1 | 5/2016 | Carr et al. |
| 2016/0171592 | A1 | 6/2016 | Pugh et al. |
| 2016/0203543 | A1* | 7/2016 | Snow ................. G06Q 30/0635 705/7.15 |
| 2016/0223339 | A1 | 8/2016 | Pellow et al. |
| 2016/0247113 | A1 | 8/2016 | Rademaker |
| 2016/0253740 | A1 | 9/2016 | Goulart |
| 2016/0258762 | A1 | 9/2016 | Taylor et al. |
| 2016/0260158 | A1 | 9/2016 | High et al. |
| 2016/0299782 | A1 | 10/2016 | Jones et al. |
| 2016/0314429 | A1 | 10/2016 | Gillen et al. |
| 2016/0321605 | A1* | 11/2016 | Maifeld ............ G06Q 10/0875 |
| 2016/0350837 | A1 | 12/2016 | Williams et al. |
| 2017/0024789 | A1 | 1/2017 | Frehn et al. |
| 2017/0069013 | A1 | 3/2017 | Castillo |
| 2017/0200108 | A1 | 7/2017 | Au et al. |
| 2017/0213186 | A1 | 7/2017 | Grifoni |
| 2017/0228701 | A1 | 8/2017 | Wosk et al. |
| 2017/0278047 | A1 | 9/2017 | Welty et al. |
| 2017/0285648 | A1 | 10/2017 | Welty et al. |
| 2017/0369245 | A1 | 12/2017 | Suemitsu et al. |
| 2018/0121992 | A1 | 5/2018 | Agarwal et al. |
| 2018/0137452 | A1 | 5/2018 | Khartravath et al. |
| 2018/0182054 | A1 | 6/2018 | Yao et al. |
| 2018/0314991 | A1 | 11/2018 | Grundberg |
| 2018/0342031 | A1 | 11/2018 | Tada et al. |

FOREIGN PATENT DOCUMENTS

| | | |
|---|---|---|
| CN | 102137100 A | 7/2011 |
| CN | 102377629 A | 3/2012 |
| DE | 102012100354 | 7/2013 |
| WO | 2016119747 A1 | 8/2016 |
| WO | 2016119749 | 8/2016 |

* cited by examiner

Database(s) 302

Fulfillment Time Database(s) 501

Fulfillment Site Database(s) 502

Navigation Database(s) 503

Shift Schedule Database(s) 504

Picking Assignment Database(s) 505

Transaction Database(s) 506

FIG. 5

SYSTEMS TO FULFILL A PICKED SALES ORDER AND RELATED METHODS THEREFOR

CROSS-REFERENCE TO RELATED APPLICATIONS

This application claims the benefit of (i) U.S. Provisional Patent Application No. 62/486,275, filed Apr. 17, 2017, (ii) U.S. Provisional Patent Application No. 62/486,254, filed Apr. 17, 2017, and (iii) U.S. Provisional Patent Application No. 62/486,266, filed Apr. 17, 2017. U.S. Provisional Patent Application No. 62/486,275, U.S. Provisional Patent Application No. 62/486,254, and U.S. Provisional Patent Application No. 62/486,266 are incorporated herein by reference in their entirety.

FIELD OF THE INVENTION

This disclosure relates generally to systems to fulfill a picked sales order, and relates more particularly to systems to timely fulfill an expedited picked sales order and related methods.

DESCRIPTION OF THE BACKGROUND

To remain competitive in the retail market, brick and mortar stores are continuously looking for ways to innovate and provide new services to customers. Accordingly, brick and mortar stores are beginning to enter the growing market of expedited orders, which is poised to grow upward of twenty-five percent over the next five years. Indeed, customers of mature online markets are increasingly willing to pay a premium for instant or same day fulfillment of products, such as, for example, groceries, small electronics, automotive parts, etc. Despite potentially having a smaller assortment than their online counterparts, brick and mortar stores can have an advantage over online stores due to their proximity to customers and their ability to provide store pick-up as an additional channel of fulfillment. Nonetheless, capturing the customers of the expedited order market will likely hinge on the ability to provide expedited orders with short and reliable lead times. Accordingly, a need or potential for benefit exists for systems and methods to timely fulfill an expedited picked sales order.

BRIEF DESCRIPTION OF THE DRAWINGS

To facilitate further description of the embodiments, the following drawings are provided in which:

FIG. 5 illustrates a representative block diagram of one or more databases of the system of FIG. 3, according to the embodiment of FIG. 3;

Figure 1:
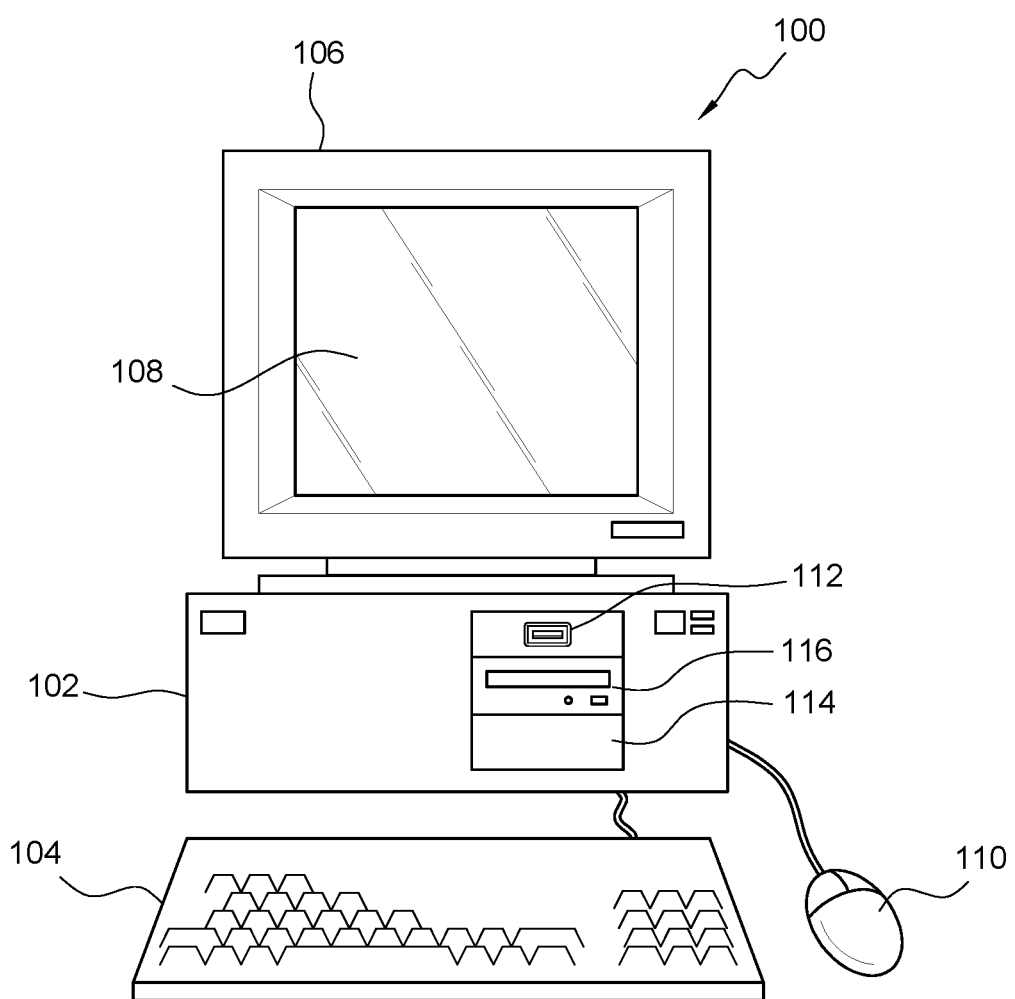
FIG. 1 illustrates a front elevational view of an exemplary computer system that is suitable to implement at least part of a central computer system, at least part of one or more user computer systems, and/or at least part of one or more third party computer systems of the system of FIG. 3, and/or to implement at least part of one or more of the activities of the method of FIG. 7 or one or more other methods described herein.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXAMPLES OF EMBODIMENTS

Some embodiments include a system. The system can comprise one or more processors and one or more non-transitory memory storage devices storing computer instructions configured to run on the one or more processors and perform acts comprising: receiving a request for a picked sales order, wherein the picked sales order is associated with a customer, the picked sales order comprises one or more goods, and the one or more goods are being offered for sale; estimating an estimated fulfillment time interval to make ready the one or more goods of the picked sales order for receipt by the customer, wherein estimating the estimated fulfillment time interval to make ready the one or more goods of the picked sales order for receipt by the customer comprises evaluating whether the picked sales order is able to be batched in a picked sales order batch using a k-means clustering to minimize a pick walk of the picked sales order batch; determining a receivable clock time at which to promise the one or more goods for receipt by the customer, wherein determining the receivable clock time at which to promise the one or more goods for receipt by the customer comprises: (i) identifying a current clock time, (ii) identifying a first available clock time of one or more predetermined clock times, wherein a difference of the first available clock time and the current clock time is greater than the estimated fulfillment time interval, and the first available clock time occurs after the current clock time and is nearest to the current clock time, and (iii) assigning the first available clock time as the receivable clock time; and communicating the receivable clock time to the customer.

Further embodiments include a method. The method can comprise: executing one or more first computer instructions configured to receive a request for a picked sales order, wherein the picked sales order is associated with a customer, the picked sales order comprises one or more goods, and the one or more goods are being offered for sale; executing one or more second computer instructions configured to estimate an estimated fulfillment time interval to make ready the one or more goods of the picked sales order for receipt by the customer, wherein executing the one or more second computer instructions comprises executing one or more third computer instructions configured to evaluate whether the picked sales order is able to be batched in a picked sales order batch using a k-means clustering to minimize a pick walk of the picked sales order batch; executing one or more fourth computer instructions configured to determine a receivable clock time at which to promise the one or more goods for receipt by the customer, wherein executing the one or more fourth computer instructions comprises: (i) executing one or more fifth computer instructions configured to identify a current clock time, (ii) executing one or more sixth computer instructions configured to identify a first available clock time of one or more predetermined clock times, wherein a difference of the first available clock time and the current clock time is greater than the estimated fulfillment time interval, and the first available clock time occurs after the current clock time and is nearest to the current clock time, and (iii) executing one or more seventh computer instructions configured to assign the first available clock time as the receivable clock time; and executing one or more eighth computer instructions configured to communicate the receivable clock time to the customer. Further, the first computer instruction(s), the second computer instruction(s), the third computer instruction(s), and the eighth computer instruction(s) can be configured to run at one or more processors and configured to be stored at one or more non-transitory memory storage devices.

Further embodiments include a system. The system can comprise one or more processors and one or more non-transitory memory storage devices storing computer instructions configured to run on the one or more processors and perform acts comprising: receiving a request for a picked sales order, wherein the picked sales order is associated with a customer, the picked sales order comprises one or more goods, and the one or more goods are being offered for sale; estimating an estimated fulfillment time interval to make ready the one or more goods of the picked sales order for receipt by the customer, wherein estimating the estimated fulfillment time interval to make ready the one or more goods of the picked sales order for receipt by the customer comprises evaluating whether the picked sales order is able to be batched in a picked sales order batch using (i) a k-means clustering to minimize a pick walk of the picked sales order batch and (ii) a Pareto optimization to maximize a tote fill of the picked sales order batch; determining a receivable clock time at which to promise the one or more goods for receipt by the customer, wherein determining the receivable clock time at which to promise the one or more goods for receipt by the customer comprises: (i) identifying a current clock time, (ii) identifying a first available clock time of one or more predetermined clock times, wherein a difference of the first available clock time and the current clock time is greater than the estimated fulfillment time interval, and the first available clock time occurs after the current clock time and is nearest to the current clock time, and (iii) assigning the first available clock time as the receivable clock time; and communicating the receivable clock time to the customer.

Some embodiments include a system. The system can comprise one or more processors and one or more non-transitory memory storage devices storing computer instructions configured to run on the one or more processors and perform acts comprising: receiving a request for a picked sales order, wherein the picked sales order is associated with a customer, the picked sales order comprises one or more goods, and the one or more goods are being offered for sale; estimating an estimated fulfillment time interval to make ready the one or more goods of the picked sales order for receipt by the customer, wherein estimating the estimated fulfillment time interval to make ready the one or more goods of the picked sales order for receipt by the customer comprises evaluating an availability of one or more pickers to pick the one or more goods; determining a receivable clock time at which to promise the one or more goods for receipt by the customer, wherein determining the receivable clock time at which to promise the one or more goods for receipt by the customer comprises: (i) identifying a current clock time, (ii) identifying a first available clock time of one or more predetermined clock times, wherein a difference of the first available clock time and the current clock time is greater than the estimated fulfillment time interval, and the first available clock time occurs after the current clock time and is nearest to the current clock time, and (iii) assigning the first available clock time as the receivable clock time; and communicating the receivable clock time to the customer.

Further embodiments include a method. The method can comprise: executing one or more first computer instructions configured to receive a request for a picked sales order, wherein the picked sales order is associated with a customer, the picked sales order comprises one or more goods, and the one or more goods are being offered for sale; executing one or more second computer instructions configured to estimate an estimated fulfillment time interval to make ready the one or more goods of the picked sales order for receipt by the customer, wherein executing the one or more second computer instructions comprises executing one or more third computer instructions configured to evaluate an availability of one or more pickers to pick the one or more goods; executing one or more fourth computer instructions configured to determine a receivable clock time at which to promise the one or more goods for receipt by the customer, wherein executing the one or more fourth computer instructions comprises: (i) executing one or more fifth computer instructions configured to identify a current clock time, (ii) executing one or more sixth computer instructions configured to identify a first available clock time of one or more predetermined clock times, wherein a difference of the first available clock time and the current clock time is greater than the estimated fulfillment time interval, and the first available clock time occurs after the current clock time and is nearest to the current clock time, and (iii) executing one or more seventh computer instructions configured to assign the first available clock time as the receivable clock time; and executing one or more eighth computer instructions configured to communicate the receivable clock time to the customer. Further, the first computer instruction(s), the second computer instruction(s), the third computer instruction(s), and the eighth computer instruction(s) can be configured to run at one or more processors and configured to be stored at one or more non-transitory memory storage devices.

Further embodiments include a system. The system can comprise one or more processors and one or more non-transitory memory storage devices storing computer instructions configured to run on the one or more processors and perform acts comprising: receiving a request for a picked sales order, wherein the picked sales order is associated with a customer, the picked sales order comprises one or more goods, and the one or more goods are being offered for sale; estimating an estimated fulfillment time interval to make ready the one or more goods of the picked sales order for receipt by the customer, wherein estimating the estimated fulfillment time interval to make ready the one or more goods of the picked sales order for receipt by the customer comprises: (i) evaluating an availability of the one or more pickers to pick the one or more goods, (ii) evaluating a quantity of the one or more goods, (iii) evaluating one or more good types of the one or more goods, (iv) evaluating a quantity of aisle switches associated with picking the one or more goods, (v) evaluating the conveyance type of the picked sales order, and (vi) evaluating whether one or more previously promised picked sales orders have been canceled; determining a receivable clock time at which to promise the one or more goods for receipt by the customer, wherein determining the receivable clock time at which to promise the one or more goods for receipt by the customer comprises: (i) identifying a current clock time, (ii) identifying a first available clock time of one or more predetermined clock times, wherein a difference of the first available clock time and the current clock time is greater than the estimated fulfillment time interval, and the first available clock time occurs after the current clock time and is nearest to the current clock time, and (iii) assigning the first available clock time as the receivable clock time; and communicating the receivable clock time to the customer. Further, evaluating the availability of the one or more pickers to pick the one or more goods can comprise: (i) receiving a picker status of a picker of one or more pickers; and (ii) evaluating the picker status of the picker. Meanwhile, the picker status can be selected by the picker, and the picker status is selected from one of: (i) an available picker status, (ii) a limited wind-down picker status, and (iii) a full wind-down picker status.

Some embodiments include a system. The system can comprise one or more processors and one or more non-transitory memory storage devices storing computer instructions configured to run on the one or more processors and perform acts comprising: receiving a request for a picked sales order, wherein the picked sales order is associated with a customer, the picked sales order comprises one or more goods, and the one or more goods are being offered for sale; promising the one or more goods of the picked sales order for receipt by the customer at a receivable clock time; after promising the one or more goods of the picked sales order for receipt by the customer at the receivable clock time, detecting a delay condition associated with making ready the one or more goods of the picked sales order for receipt by the customer at the receivable clock time; and communicating a notification of the delay condition to a receiving party.

Further embodiments include a method. The method can comprise: executing one or more first computer instructions configured to receive a request for a picked sales order, wherein the picked sales order is associated with a customer, the picked sales order comprises one or more goods, and the one or more goods are being offered for sale; executing one or more second computer instructions configure to promise the one or more goods of the picked sales order for receipt by the customer at a receivable clock time; after executing the one or more second computer instructions, executing one or more third computer instructions configured to detect a delay condition associated with making ready the one or more goods of the picked sales order for receipt by the customer at the receivable clock time; and executing one or more fourth computer instructions configured to communicate a notification of the delay condition to a receiving party. Further, the first computer instruction(s), the second computer instruction(s), the third computer instruction(s), and the fourth computer instruction(s) can be configured to run at one or more processors and configured to be stored at one or more non-transitory memory storage devices.

Further embodiments include a system. The system can comprise one or more processors and one or more non-transitory memory storage devices storing computer instructions configured to run on the one or more processors and perform acts comprising: receiving a request for a picked sales order, wherein the picked sales order is associated with a customer, the picked sales order comprises one or more goods, and the one or more goods are being offered for sale; promising the one or more goods of the picked sales order for receipt by the customer at a receivable clock time; after promising the one or more goods of the picked sales order for receipt by the customer at the receivable clock time, detecting a delay condition associated with making ready the one or more goods of the picked sales order for receipt by the customer at the receivable clock time; communicating a first notification of the delay condition to a first receiving party; and communicating a second notification of the delay condition to a second receiving party other than the first receiving party. In these or other embodiments, the first receiving party can comprise a first one of (i) a picker of the one or more goods of the picked sales order, (ii) a packer of the one or more goods of the picked sales order, (iii) a deliverer of the one or more goods of the picked sales order, (iv) an operator of the system, or (v) the customer. Further, the second receiving party can comprise a second one of (i) the picker of the one or more goods of the picked sales order, (ii) the packer of the one or more goods of the picked sales order, (iii) the deliverer of the one or more goods of the picked sales order, (iv) the operator of the system, or (v) the customer.

Figure 2:
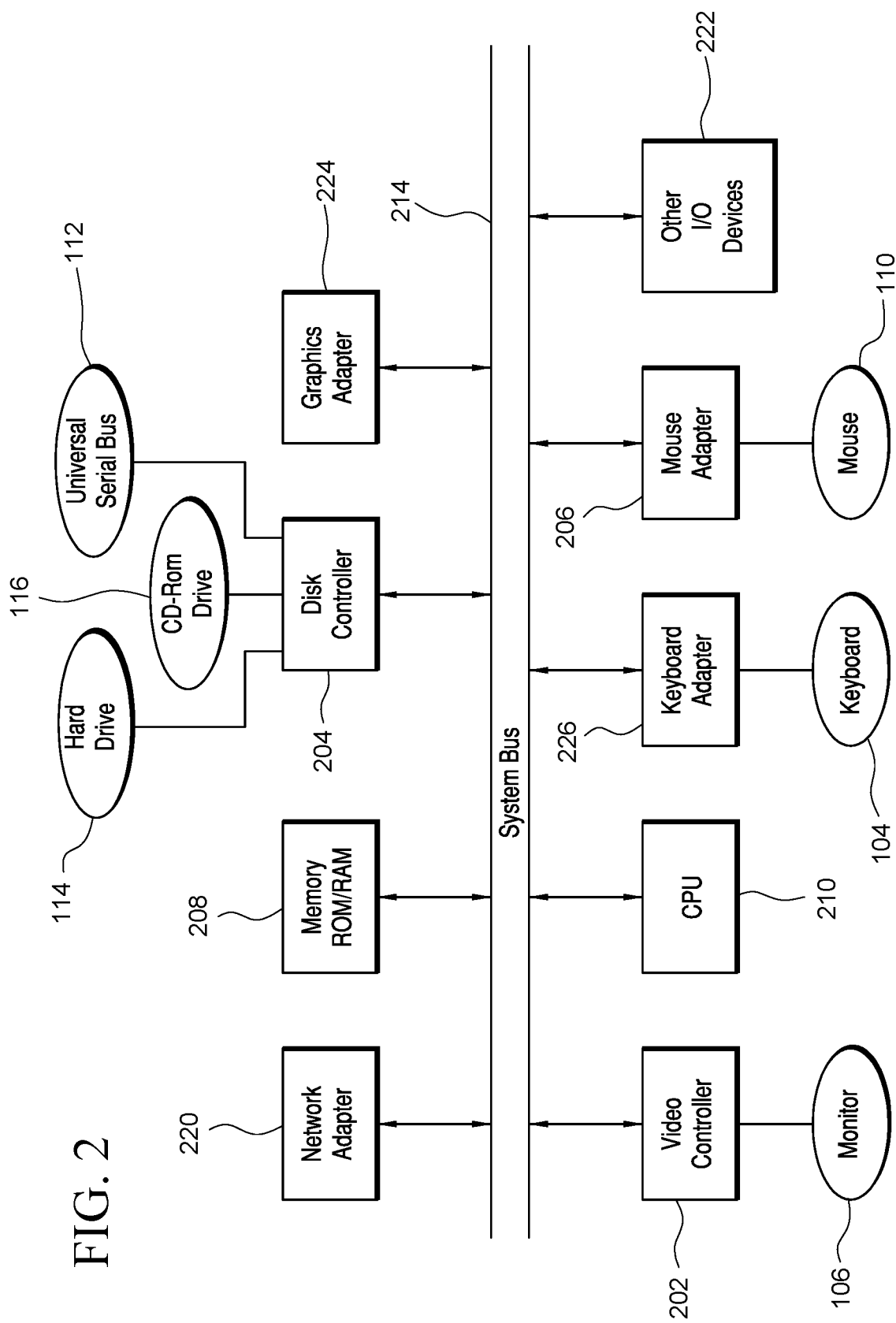
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage devices described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM), Digital Video Disc (DVD) drive, and/or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

The memory storage device(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1 & 2), hard drive 114 (FIGS. 1 & 2), CD-ROM and/or DVD drive 116 (FIGS. 1 & 2), a floppy disk drive (not shown), an optical disc (not shown), a magneto-optical disc (now shown), magnetic tape (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 100 (FIG. 1) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 100 (FIG. 1). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) iOS™ by Apple Inc. of Cupertino, Calif., United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Wash., United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage device(s) of the various embodiments disclosed herein can be executed by CPU 210 (FIG. 2). At least a portion of the program instructions, stored on these devices, can be suitable for carrying out at least part of the techniques, methods, and activities of the methods described herein. In various embodiments, computer system 100 can be reprogrammed with one or more systems, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a mobile device, such as a smart phone or a barcode scanning computer. In certain additional embodiments, computer system 100 may comprise an embedded system.

Figure 3:
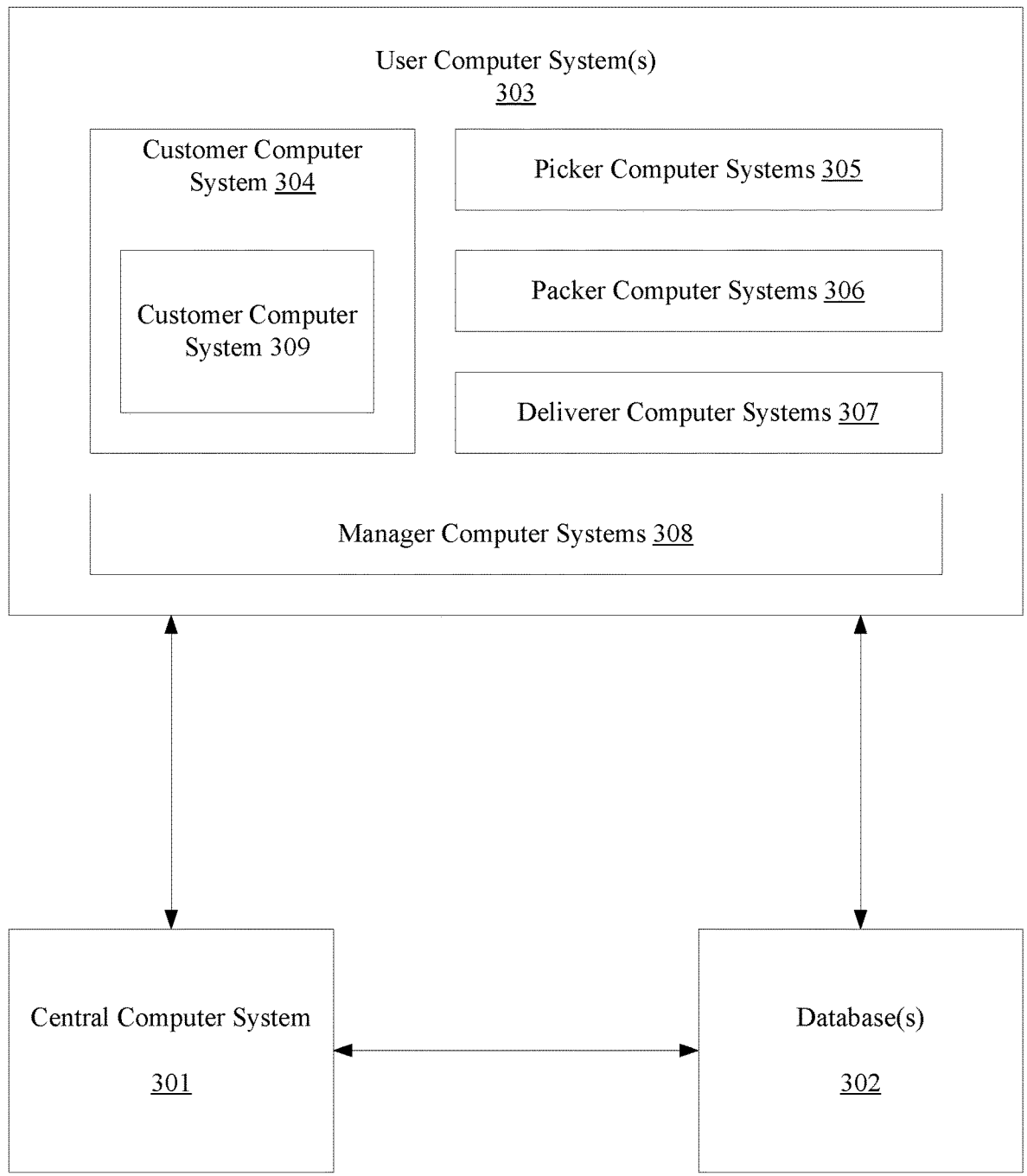
FIG. 3 illustrates a representative block diagram of a system, according to an embodiment.

Skipping ahead now in the drawings, FIG. 3 illustrates a representative block diagram of a system 300, according to an embodiment. In many embodiments, system 300 can comprise a computer system. In some embodiments, system 300 can be implemented to perform part or all of one or more methods (e.g., method 700 (FIG. 7)).

System 300 is merely exemplary and embodiments of the system are not limited to the embodiments presented herein. System 300 can be employed in many different embodiments or examples not specifically depicted or described herein. In some embodiments, certain elements of system 300 can perform various methods and/or activities of those methods. In these or other embodiments, the methods and/or the activities of the methods can be performed by other suitable elements of system 300.

As explained in greater detail below, in many embodiments, system 300 can be operable to fulfill a picked sales order, and in further embodiments, system 300 can be operable to timely fulfill an expedited picked sales order. For example, in some embodiments, system 300 can receive a request for a picked sales order. In further embodiments, system 300 can estimate an estimated fulfillment time interval to make ready the one or more goods of the picked sales order for receipt by the customer associated with the picked sales order, determine a receivable clock time at which to promise the good(s) for receipt by the customer, and communicate the receivable clock time to the customer. In these or other embodiments, system 300 can promise the good(s) of the picked sales order for receipt by the customer at the receivable clock time. In further embodiments, after promising the good(s) of the picked sales order for receipt by the customer at the receivable clock time, system 300 can detect one or more delay conditions associated with making ready the good(s) of the picked sales order for receipt by the customer at the receivable clock time, and can communicate one or more notifications of the delay condition(s) to one or more receiving parties (e.g., a picker, a packer, a deliverer, a manager, an operator of system 300, and/or the customer, etc.).

As used herein, the term "picked sales order" refers to a sales order that is requested by a customer, and that comprises one or more goods offered for sale to the customer and made ready for receipt by the customer. The good(s) may be offered for sale to the customer by the operator of system 300, or by another entity (e.g., a third-party retailer).

Further, the term "expedited picked sales order" refers to a picked sales order that is made ready for receipt by the customer within a predetermined window of time. For example, the predetermined window of time can be a unit of time (e.g., a day, etc.) during which the picked sales order is requested (e.g., a same-day picked sales order) or can be a quantity of time (e.g., minutes, one or more hours, one or more days, etc.) from when the picked sales order is requested (e.g., 30 minutes, one hour, two hours, four hours, etc.). In some embodiments, the predetermined window of time can be established by the operator of system 300, or when the good(s) of the expedited picked sales order are being offered for sale by an entity other than the operator of system 300, by the entity other than the operator of system 300. In some embodiments, the customer can pay a premium for an expedited picked sales order over the cost of a standard picked sales order.

Making ready the good(s) for receipt by the customer can include performing one or more activities to prepare the good(s) to be transferred to the customer. The activity or activities can be performed by one or more entities (e.g., one or more persons and/or one or more robots). For example, the good(s) can be collected by a picker, such as, for example, at a warehouse, a distribution center, or a retail brick and mortar store, in order to make ready the good(s) for receipt by the customer. Further, the good(s) collected by the picker can be packed by a packer into one or more containers to make ready the good(s) for receipt by the customer. Further still, the good(s) collected by the picker, and optionally packed by the packer, can be delivered by a deliverer to a predetermined location (e.g., a pick-up station of a brick and mortar store at which the good(s) are collected or of a different brick and mortar store, distribution center, or warehouse, a pick-up station of a warehouse at which the good(s) are collected or of a different warehouse, distribution center, or brick and mortar store, a pick-up station of a distribution center at which the good(s) are collected or of a different distribution center, warehouse, or brick and mortar store, a stationary or mobile locker, etc.) for pick-up by the customer, or directly to the customer (e.g., by manned or autonomous delivery). For example, autonomously delivered goods can be delivered to the customer by a droid or a drone. Further, in some embodiments, a pick-up station or a locker can be manned or autonomous, such as, for example, using radio frequency identification, near field communication, and/or image recognition to autonomously dispense the good(s) of a picked sales order. Further still, in some embodiments, manually delivered goods can be delivered by crowd-sourced delivery. As used herein, the term "picker" refers to an entity (e.g., a person or robot) assigned the activity of collecting the good(s) of a picked sales order; the term "packer" refers to an entity (e.g., a person or robot) assigned the activity of packing the good(s) of a picked sales order; and the term "deliverer" refers to an entity (e.g., a person or robot) assigned the activity of delivering the good(s) of a picked sales order to a pick-up point or directly to a customer associated with the picked sales order. Although the terms "picker," "packer," and/or "deliverer" are generally referred to herein as being separate entities, in some embodiments, two or more of the picker, packer, and/or deliverer can be the same entity. Meanwhile, although the picker, packer, and/or deliverer of a particular picked sales order may be referred to herein in the singular form, in some embodiments, the activities performed by the picker, packer, and/or deliverer can be performed by multiple pickers, packers, and/or deliverers.

Also, as used herein, the term "manager" can refer to an entity (e.g., a person) responsible for supervising one or more other entities responsible for making ready the good(s) of a picked sales order for receipt by a customer. Although a manager may be discussed herein as being responsible for supervising one type of entity responsible for making ready the good(s) of a picked sales order for receipt by a customer (e.g., pickers, packers, deliverers, etc.), in some embodiments, a manager may be responsible for supervising multiple types of entities responsible for making ready the good(s) of a picked sales order for receipt by a customer.

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

Specifically, system 300 can comprise a central computer system 301. In many embodiments, central computer system 301 can be similar or identical to computer system 100 (FIG. 1). Accordingly, central computer system 301 can comprise one or more processors and one or more memory storage devices (e.g., one or more non-transitory memory storage devices). In these or other embodiments, the processor(s) and/or the memory storage device(s) can be similar or identical to the processor(s) and/or memory storage device(s) (e.g., non-transitory memory storage devices) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more output devices (e.g., one or more monitors, one or more touch screen displays, one or more speakers, etc.). Accordingly, the input device(s) can comprise one or more devices configured to receive one or more inputs, and/or the output device(s) can comprise one or more devices configured to provide (e.g., present, display, emit, etc.) one or more outputs. For example, in these or other embodiments, one or more of the input device(s) can be similar or identical to keyboard 104 (FIG. 1) and/or a mouse 110 (FIG. 1). Further, one or more of the output device(s) can be similar or identical to refreshing monitor 106 (FIG. 1) and/or screen 108 (FIG. 1). The input device(s) and the output device(s) can be coupled to the processor(s) and/or the memory storage device(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the output device(s) to the processor(s) and/or the memory storage device(s). In some embodiments, the KVM switch also can be part of central computer system 301. In a similar manner, the processor(s) and the memory storage device(s) can be local and/or remote to each other.

In many embodiments, central computer system 301 is configured to communicate with one or more user computer systems 303 of one or more users (e.g., one or more customers, one or more pickers, one or more packers, one or more deliverers, and/or one or more managers, etc.) of system 300. For example, the user(s) can interface (e.g., interact) with central computer system 301, and vice versa, via user computer system(s) 303.

In these or other embodiments, user computer system(s) 303 can comprise one or more customer computer systems 304 of one or more customers, one or more picker computer systems 305 of one or more pickers, one or more packer computer systems 306 of one or more packers, one or more deliverer computer systems 307 of one or more delivers, and/or one or more manager computer systems 308 of one or more managers. Further, customer computer system(s) 304 can comprise customer computer system 309. In some embodiments, system 300 can comprise one or more of user computer system(s) 303.

In many embodiments, central computer system 301 can refer to a back end of system 300 operated by an operator and/or administrator of system 300. In these or other embodiments, the operator and/or administrator of system 300 can manage central computer system 301, the processor(s) of central computer system 301, and/or the memory storage device(s) of central computer system 301 using the input device(s) and/or output device(s) of central computer system 301.

Like central computer system 301, user computer system(s) 303 each can be similar or identical to computer system 100 (FIG. 1), and in many embodiments, multiple or all of user computer system(s) 303 can be similar or identical to each other. In many embodiments, user computer system(s) 303 can comprise one or more desktop computer devices and/or one or more mobile devices, etc. At least part of central computer system 301 can be located remotely from user computer system(s) 303.

In some embodiments, a mobile device can refer to a portable electronic device (e.g., an electronic device easily conveyable by hand by a person of average size) with the capability to present audio and/or visual data (e.g., text, images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a barcode scanning computer, a wearable computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For example, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4016 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) iOS™ by Apple Inc. of Cupertino, Calif., United States of America, (ii) Blackberry® OS by Research In Motion (RIM) of Waterloo, Ontario, Canada, (iii) Android™ OS developed by the Open Handset Alliance, or (iv) Windows Mobile™ OS by Microsoft Corp. of Redmond, Wash., United States of America.

Meanwhile, in many embodiments, for reasons explained later herein, central computer system 301 also can be configured to communicate with one or more databases 302 (e.g., one or more fulfillment time databases 501 (FIG. 5), one or more fulfillment site databases 502 (FIG. 5), one or more navigation databases 503 (FIG. 5), one or more shift schedule databases 504, one or more picking assignment databases 505, one or more transaction databases 506, etc.). Database(s) 302 can be stored on one or more memory storage devices (e.g., non-transitory memory storage device(s)), which can be similar or identical to the one or more memory storage device(s) (e.g., non-transitory memory storage device(s)) described above with respect to computer system 100 (FIG. 1). Also, in some embodiments, for any particular database of database(s) 302, that particular database can be stored on a single memory storage device of the memory storage device(s) and/or the non-transitory memory storage device(s) storing database(s) 302 or it can be spread across multiple of the memory storage device(s) and/or non-transitory memory storage device(s) storing database(s) 302, depending on the size of the particular database and/or the storage capacity of the memory storage device(s) and/or non-transitory memory storage device(s).

In these or other embodiments, the memory storage device(s) of central computer system 301 can comprise some or all of the memory storage device(s) storing database(s) 302. In further embodiments, some of the memory storage device(s) storing database(s) 302 can be part of one or more of user computer system(s) 303 and/or one or more third-party computer systems (i.e., other than central computer system 301 and/or user computer system(s) 303), and in still further embodiments, all of the memory storage device(s) storing database(s) 302 can be part of one or more of user computer system(s) 303 and/or one or more of the third-party computer system(s). Like central computer system 301 and/or user computer system(s) 303, when applicable, each of the third-party computer system(s) can be similar or identical to computer system 100 (FIG. 1). Notably, the third-party computer systems are not shown at FIG. 3 in order to avoid unduly cluttering the illustration of FIG. 3, and database(s) 302 are illustrated at FIG. 3 apart from central computer system 301 and user computer system(s) 303 to better illustrate that database(s) 302 can be stored at memory storage device(s) of central computer system 301, user computer system(s) 303, and/or the third-party computer system(s), depending on the manner in which system 300 is implemented.

Database(s) 302 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, communication between central computer system 301, user computer system(s) 303, the third-party computer system(s), and/or database(s) 302 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOC SIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

For convenience, the functionality of system 300 generally is described herein as it relates particularly to customer computer system 309 of customer computer system(s) 304, a single customer, and a single picked sales order, but in many embodiments, the functionality of system 300 can be extended to multiple customer computer systems of customer computer system(s) 304, multiple customers, and multiple picked sales orders, at the same or at different times.

Figure 4:
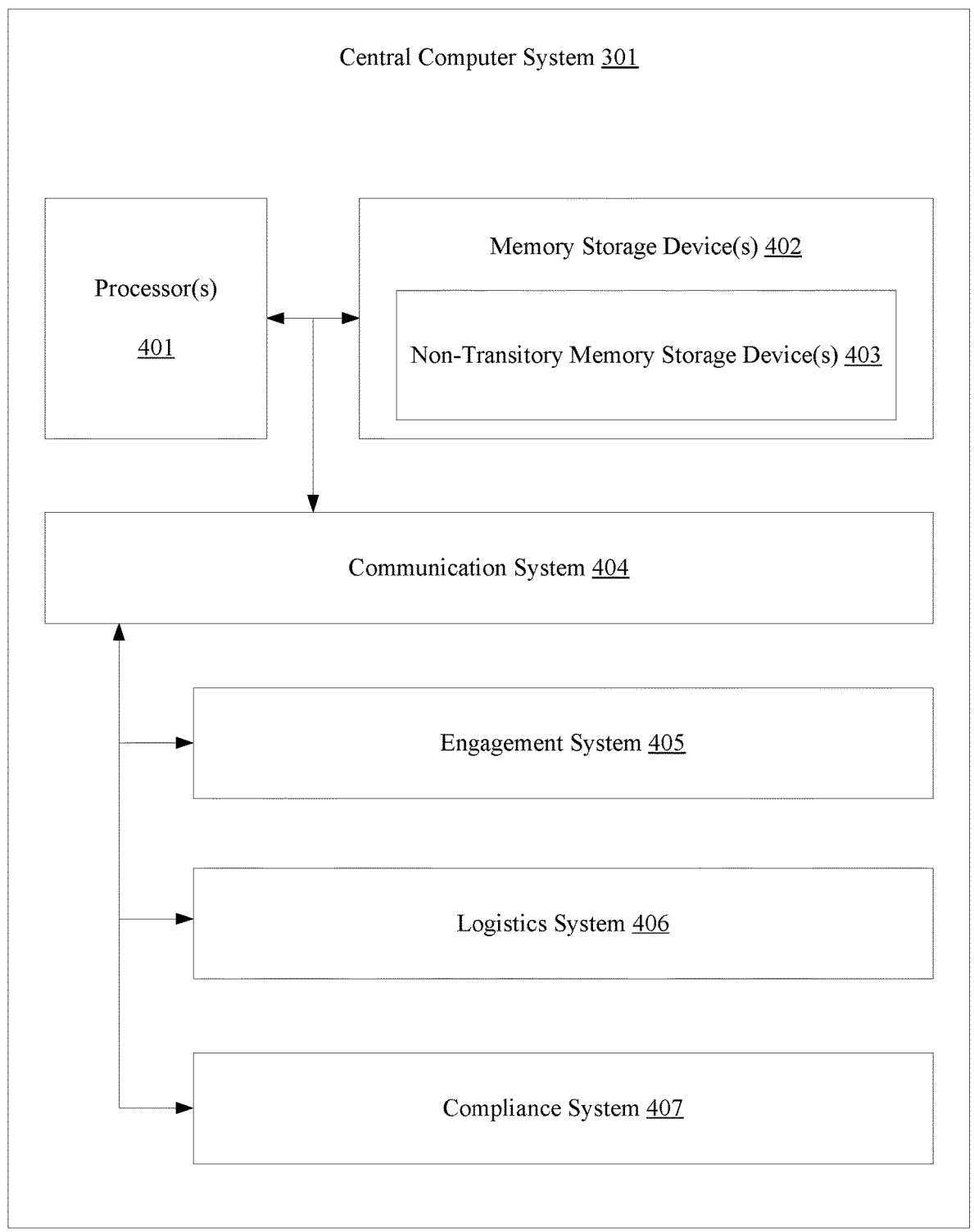
FIG. 4 illustrates a representative block diagram of a central computer system of the system of FIG. 3, according to the embodiment of FIG. 3.

Turning ahead now in the drawings, FIG. 4 illustrates a representative block diagram of central computer system 301, according to the embodiment of FIG. 3; and FIG. 5 illustrates a representative block diagram of database(s) 302, according to the embodiment of FIG. 3.

Referring to FIG. 4, in many embodiments, central computer system 301 can comprise one or more processors 401 and one or more memory storage devices 402. Further, memory storage device(s) 402 can comprise one or more non-transitory memory storage devices 403.

Meanwhile, in these or other embodiments, central computer system 301 comprises a communication system 404, an engagement system 405, a logistics system 406, and a compliance system 407. In these or other embodiments, part or all of at least one or more of communication system 404, engagement system 405, logistics system 406, and compliance system 407 can be part of at least one or more others of communication system 404, engagement system 405, logistics system 406, and compliance system 407, and vice versa.

In many embodiments, processor(s) 401 can be similar or identical to the processor(s) described above with respect to computer system 100 (FIG. 1) and/or central computer system 301 (FIG. 3); memory storage device(s) 402 can be similar or identical to the memory storage device(s) described above with respect to computer system 100 (FIG. 1) and/or central computer system 301 (FIG. 3); and/or non-transitory memory storage device(s) 403 can be similar or identical to the non-transitory memory storage device(s) described above with respect to computer system 100 (FIG. 1) and/or central computer system 301 (FIG. 3). Further, communication system 404, engagement system 405, logistics system 406, and compliance system 407 can be implemented with hardware and/or software, as desirable. Although communication system 404, engagement system 405, logistics system 406, and compliance system 407 are shown at FIG. 4 as being separate from processor(s) 401, memory storage device(s) 402, and/or non-transitory memory storage device(s) 403, in many embodiments, part or all of communication system 404, engagement system 405, logistics system 406, and compliance system 407 can be stored at memory storage device(s) 402 and/or non-transitory memory storage device(s) 403 and can be called and run at processor(s) 401, such as, for example, when the part or all of communication system 404, engagement system 405, logistics system 406, and compliance system 407 are implemented as software.

Communication System 404

Communication system 404 can provide and manage communication between the various elements of central computer system 301 (e.g., processor(s) 401, memory storage device(s) 402, non-transitory memory storage device(s) 403, communication system 404, engagement system 405, logistics system 406, compliance system 407, etc.) and manage incoming and outgoing communications between central computer system 301 (FIG. 3) and user computer system(s) 303 (FIG. 3), the third party computer system(s), and/or database(s) 302 (FIG. 3). Like the communications between central computer system 301 (FIG. 3), user computer system(s) 303 (FIG. 3), the third party computer system(s), and/or database(s) 302 (FIG. 3), communication system 404 can be implemented using any suitable manner of wired and/or wireless communication, and/or using any one or any combination of wired and/or wireless communication network topologies and/or protocols, as described above with respect to the central computer system 301 (FIG. 3), user computer system(s) 303 (FIG. 3), the third party computer system(s), and/or database(s) 302 (FIG. 3). In many embodiments, communication system 404 can be part of hardware and/or software implemented for communications between central computer system 301 (FIG. 3), user computer system(s) 303 (FIG. 3), the third party computer system(s), and/or database(s) 302 (FIG. 3). For example, as applicable, communication system 404 can permit processor(s) 401 to call (i) software (e.g., at least part of engagement system 405, logistics system 406, compliance system 407, etc.) stored at memory storage device(s) 402 and/or non-transitory memory storage device(s) 403, and/or (ii) data stored at memory storage device(s) 402, at non-transitory memory storage device(s) 403, and/or in database(s) 302 (FIG. 3).

Engagement System 405

Engagement system 405 can receive a request for a picked sales order associated with a customer. In some embodiments, the picked sales order can comprise an expedited picked sales order.

The request for the picked sales order can comprise picked sales order details. The picked sales order details can specify any suitable information regarding the picked sales order. For example, the picked sales order details can specify the good(s) of the picked sales order. In some embodiments, the picked sales order details also can specify a conveyance type of the picked sales order. A conveyance type can refer to a manner by which that good(s) of the picked sales order are to be provided for transfer to the customer. For example, the conveyance type can indicate that the good(s) will be delivered to a predetermined location (e.g., a pick-up station of a brick and mortar store at which the good(s) are collected or of a different brick and mortar store, distribution center, or warehouse, a pick-up station of a warehouse at which the good(s) are collected or of a different warehouse, distribution center, or brick and mortar store, a pick-up station of a distribution center at which the good(s) are collected or of a different distribution center, warehouse, or brick and mortar store, a stationary or mobile locker, etc.) for transfer to the customer, or that the good(s) will be delivered directly to the customer (e.g., by manned or autonomous delivery), including a location of the delivery.

In many embodiments, engagement system 405 can receive the request for the picked sales order from the customer. For example, the customer can use customer computer system 309 (FIG. 3) to generate the request for the picked sales order and provide the request for the picked sales order to central computer system 301 (FIG. 3), and communication system 404 can provide the request for the picked sales order to engagement system 405. For example, engagement system 405 can generate a graphical user interface at customer computer system 309 (FIG. 3) from which the customer can request the picked sales order and enter the picked sales order details.

Further, engagement system 405 can promise the good(s) of the picked sales order for receipt by the customer at a receivable clock time. As used herein, the term "receivable clock time" refers to a clock time at which the good(s) of a picked sales order are to be ready to be transferred to a customer. The receivable clock time can be based on the local time at the location of the customer, at the location where the good(s) are being picked, and/or at the delivery or pick-up location of the good(s).

For example, in many embodiments, engagement system 405 can instruct logistics system 406 via communications system 404 to determine the receivable clock time for the picked sales order. Responsive to engagement system 405 instructing logistics system 406 to determine the receivable clock time for the picked sales order, logistics system 406 can determine the receivable clock time for the picked sales order as explained below, and can provide the receivable clock time to engagement system 405 via communications system 404.

In many embodiments, after receiving the receivable clock time from logistics system 406, engagement system 405 can communicate the receivable clock time to the customer. For example, engagement system 405 can provide the receivable clock time to communication system 404, and can direct communication system 404 to send the receivable clock time from central computer system 301 (FIG. 3) to consumer computer system 309 (FIG. 3). In some embodiments, the receivable clock time can be displayed to the customer at the graphical user interface. In some embodiments, engagement system 405 can communicate the receivable clock time to the customer regardless of whether the customer is at a brick and mortar store, distribution center, or warehouse.

In some embodiments, before communicating the receivable clock time to the consumer, engagement system 405 can identify the current clock time, and compare a difference of the receivable clock time and the current clock time (i.e., a receivable time interval) to a maximum time interval. In these embodiments, when the receivable time interval is less than or equal to the maximum time interval, engagement system 405 can proceed with communicating the receivable clock time to the customer. However, when the receivable time interval is greater than the maximum time interval, engagement system 405 can notify the customer that the picked sales order cannot be fulfilled. The current clock time can be based on the local time at the location of the customer, at the location where the good(s) are being picked, and/or at the delivery or pick-up location of the good(s).

Comparing the receivable time interval to the maximum time interval can ensure that system 300 does not attempt to fulfill a picked sales order for which the good(s) would be considered to take too much time to fulfill. Accordingly, as used herein, the "maximum time interval" can refer to a predetermined interval of time, which, if exceeded by the receivable time interval, then the receivable time interval would be considered to require too much time to fulfill the picked sales order. The maximum time interval can be any suitable interval of time. In some embodiments, the maximum time interval can be established by the operator of system 300. In other embodiments, the maximum time interval can be established by another entity that is offering for sale the good(s) of the picked sales order (e.g., a third-party retailer), such as, for example, when the operator of system 300 is not offering for sale the good(s) of the picked sales order.

In some embodiments, the customer can be permitted to include a preferred maximum time interval in the request for the picked sales order. Accordingly, in these embodiments, the preferred maximum time interval can be used for the maximum time interval.

In some embodiments, engagement system 405 can compare the receivable time interval and the maximum time interval before communicating the receivable clock time to the consumer only if the picked sales order received by engagement system 405 comprises an expedited picked sales order. For example, in these or other embodiments, the maximum time interval can be established to ensure that fulfillment of an expedited picked sales order would not be so long as to cause the expedited picked sales order to no longer be considered an expedited picked sales order. Accordingly, in some embodiments, the maximum time interval can be the same as the predetermined window of time defining an expedited picked sales order. Still, in other embodiments, engagement system 405 can compare the receivable time interval and the maximum time interval before communicating the receivable clock time to the consumer regardless of whether or not the picked sales order received by engagement system 405 comprises an expedited picked sales order.

In further embodiments, before communicating the receivable clock time to the consumer, engagement system 405 can compare the value of promising the picked sales order against the cost of promising the picked sales order. For example, engagement system 405 can review the picked sales order details (e.g., the good(s) of the picked sales order) to determine a value of promising the picked sales order, and can review the picked sales order details (e.g., conveyance type, the quantity of the good(s), the location of delivery, etc.) to determine a cost of promising the picked sales order. In these embodiments, when the value of the picked sales order exceeds the cost, engagement system 405 can proceed with communicating the receivable clock time to the customer. However, when the value is less than the cost, engagement system 405 can notify the customer that the picked sales order cannot be fulfilled.

In many embodiments, after communicating the receivable clock time to the customer, engagement system 405 can receive an acceptance of the receivable clock time. For example, if the customer approves of the receivable clock time communicated to the consumer by engagement module 405, the customer can use customer computer system 309 (FIG. 3) to provide the acceptance of the receivable clock time to central computer system 301 (FIG. 3), and communication system 404 can provide the acceptance of the receivable clock time to engagement system 405. In some embodiments, the customer can use the graphical user interface generated by engagement system 405 to provide the acceptance of the receivable clock time.

In many embodiments, after receiving the acceptance of the receivable clock time, engagement system 405 can communicate a confirmation that the picked sales order will be fulfilled to the customer. The confirmation that the picked sales order will be fulfilled can operate to promise the good(s) of the picked sales order for receipt by the customer at the receivable clock time. For example, engagement system 405 can provide the confirmation that the picked sales order will be fulfilled to communication system 404, and can direct communication system 404 to send the confirmation of the picked sales order from central computer system 301 (FIG. 3) to consumer computer system 309 (FIG. 3). In some embodiments, the confirmation that the picked sales order will be fulfilled can be displayed to the customer at the graphical user interface. In some embodiments, engagement system 405 can communicate the confirmation that the picked sales order will be fulfilled to the customer regardless of whether the customer is at a brick and mortar store, distribution center, or warehouse.

In some embodiments, when the customer includes a preferred maximum time interval in the request for the picked sales order, and when engagement system 405 communicates a confirmation that the picked sales order will be fulfilled to the customer, the customer can pay a premium. The premium can vary depending on the length of the preferred maximum time interval. For example, the premium can increase as the preferred maximum time interval decreases.

In some embodiments, after promising the good(s) of the picked sales order for receipt by the customer at the receivable clock time, engagement system 405 can periodically instruct logistics system 406 via communications system 404 to determine an updated receivable clock time for the picked sales order. Accordingly, in these or other embodiments, when the updated receivable clock time is sooner than the current receivable clock time, engagement system 405 can communicate the updated receivable clock time to the customer, giving the customer the option to provide an acceptance of the updated receivable clock time so that the customer can receive the good(s) of the picked sales order sooner.

Logistics System 406

Logistics system 406 can determine a receivable clock time at which engagement system 405 can promise the good(s) of a picked sales order for receipt by a customer associated with the picked sales order. As discussed above, in some embodiments, engagement system 405 can instruct logistics system 406 to determine the receivable clock time at which engagement system 405 can promise the good(s) of a picked sales order for receipt by a customer associated with the picked sales order when engagement system 405 receives a request for the picked sales order. After determining the receivable clock time, logistics system 406 can provide the receivable clock time to engagement system 405 via communications system 404 so that engagement system 405 can promise, and in some embodiments, optionally promise the good(s) of the picked sales order for receipt by the customer at the receivable clock time.

In order to determine the receivable clock time at which engagement system 405 can promise the good(s) of the picked sales order for receipt by the customer, logistics system 406 can estimate an estimated fulfillment time interval to make ready the good(s) of the picked sales order for receipt by the customer. As used herein, the term "estimated fulfillment time interval" refers to an estimated interval of time that is needed to make ready the good(s) of a picked sales order for receipt by the customer associated with the picked sales order. In many embodiments, logistics system 406 can estimate the estimated fulfillment time interval by evaluating one or more factors (e.g., logistical factors) relating to making ready the good(s) of the picked sales order for receipt by the customer associated with the picked sales order. In some embodiments, logistics system 406 can receive the picked sales order details of the picked sales order from engagement system 405 to facilitate logistics system 406 evaluating the factor(s) relating to making ready the good(s) of the picked sales order for receipt by the customer associated with the picked sales order.

For example, in evaluating the factor(s) relating to making ready the good(s) of the picked sales order for receipt by the customer associated with the picked sales order, for each of the factor(s), logistics system 406 can calculate a component estimated fulfillment time interval needed to make ready the good(s) of a picked sales order for receipt by the customer associated with the picked sales order corresponding to that factor. When only one factor is evaluated by logistics system 406, logistics system 406 can assign the component estimated fulfillment time interval calculated for the one factor to be the estimated fulfillment time interval to make ready the good(s) of the picked sales order for receipt by the customer. Meanwhile, when multiple factors are evaluated by logistics system 406, logistics system 406 can assign a weighted average of the multiple component estimated fulfillment time intervals calculated for the multiple factors to be the estimated fulfillment time interval to make ready the good(s) of the picked sales order for receipt by the customer. Although, in some embodiments, each of the multiple component estimated fulfillment time intervals can be assigned equal weights, in many embodiments, two or more of the multiple component estimated fulfillment time intervals can be assigned different weights based on the relative importance of the corresponding factors to the estimated fulfillment time interval.

In many embodiments, logistics system 406 can evaluate a quantity of the good(s) of the picked sales order as a factor for estimating the estimated fulfillment time interval. Accordingly, logistics system 406 can calculate a component estimated fulfillment time interval corresponding to the factor of the quantity of the good(s) of the picked sales order.

For example, logistics system 406 can refer to the picked sales order details to determine the quantity of the good(s) of the picked sales order. Further, in many embodiments, logistics system 406 can multiply the quantity of the good(s) of the picked sales order by a goods quantity average fulfillment time interval to calculate the component estimated fulfillment time interval corresponding to the factor of the quantity of the good(s) of the picked sales order. In some embodiments, the goods quantity average fulfillment time interval can be stored at fulfillment time database(s) 501 (FIG. 5), and logistics system 406 can query fulfillment time database(s) 501 (FIG. 5) via communication system 404 to determine the goods quantity average fulfillment time interval.

In many embodiments, logistics system 406 can evaluate the good type(s) of the good(s) of the picked sales order as a factor for estimating the estimated fulfillment time interval. Accordingly, logistics system 406 can calculate a component estimated fulfillment time interval corresponding to the factor of the good type(s) of the good(s) of the picked sales order. As used herein, the term "good type" can refer to a classification of a good (e.g., ambient, chilled, frozen, baked-to-order, produce, bulk, counters, etc.).

For example, logistics system 406 can refer to the picked sales order details to determine the good type(s) of the good(s) of the picked sales order and to determine the quantity of the good(s) of each of the good type(s). Further, in many embodiments, logistics system 406 can multiply the quantity of the good(s) of a particular good type by a good type average fulfillment time interval corresponding to that particular good type. Further still, logistics system 406 can sum the resulting product or products together to calculate the component estimated fulfillment time interval corresponding to the factor of the good type(s) of the good(s) of the picked sales order to calculate the component estimated fulfillment time interval corresponding to the factor of the good type(s) of the good(s) of the picked sales order. In some embodiments, the good type average fulfillment time intervals for the various potential good types can be stored at fulfillment time database(s) 501 (FIG. 5), and logistics system 406 can query fulfillment time database(s) 501 (FIG. 5) via communication system 404 to determine the relevant good type average fulfillment time intervals.

In many embodiments, logistics system 406 can evaluate a quantity of aisle switches associated with picking the good(s) of the picked sales order as a factor for estimating the estimated fulfillment time interval. As used herein, the term "aisle switch" can refer to movement of a picker from one aisle to another when collecting the good(s) of a picked sales order. Accordingly, logistics system 406 can calculate a component estimated fulfillment time interval corresponding to the factor of the quantity of aisle switches associated with picking the good(s) of the picked sales order.

For example, logistics system 406 can refer to the picked sales order details to determine the good(s) of the picked sales order. Meanwhile, logistics system 406 can query fulfillment site database(s) 502 (FIG. 5) via communication system 404 to determine on what aisle or aisles the good(s) of the picked sales order are located and to determine the quantity of aisle switches associated with picking the good(s) of the picked sales order. In many embodiments, the fulfillment site database(s) 502 (FIG. 5) can store information regarding the layout of the fulfillment site from which the good(s) of the picked sales order will be provided to the customer. Further, in many embodiments, logistics system 406 can multiply the quantity of aisle switches by an aisle quantity average fulfillment time interval to calculate the component estimated fulfillment time interval corresponding to the factor of the quantity of aisle switches associated with picking the good(s) of the picked sales order. In some embodiments, the aisle quantity average fulfillment time interval can be stored at fulfillment time database(s) 501 (FIG. 5), and logistics system 406 can query fulfillment time database(s) 501 (FIG. 5) via communication system 404 to determine the aisle quantity average fulfillment time interval.

In many embodiments, logistics system 406 can evaluate a conveyance type of the picked sales order as a factor for estimating the estimated fulfillment time interval. Accordingly, logistics system 406 can calculate a component estimated fulfillment time interval corresponding to the factor of the conveyance type of the picked sales order.

For example, logistics system 406 can refer to the picked sales order details to determine the conveyance type of the picked sales order. Also, when the conveyance type comprises a direct delivery to the customer, logistics system 406 also can refer to the picked sales order details to determine a delivery address for the customer. In some embodiments, logistics system 406 can use a conveyance type average fulfillment time interval corresponding to the conveyance type for the component estimated fulfillment time interval corresponding to the factor of the conveyance type of the picked sales order. For example, the conveyance type average fulfillment time interval can provide an average interval of time for fulfilling a picked sales order of a particular conveyance type. Further, the conveyance type average fulfillment time intervals can be stored at fulfillment time database(s) 501 (FIG. 5), and logistics system 406 can query fulfillment time database(s) 501 (FIG. 5) via communication system 404 to determine the conveyance type average fulfillment time interval corresponding to the conveyance type. In many embodiments, the conveyance type average fulfillment times can be determined as a function of dispense capacity of the conveyance type. For example, for a locker based conveyance type, the conveyance type average fulfillment time can be a function of how many cabinets the locker has, the average order size, and the ability of the locker to dispense in parallel, whether the locker can dispense autonomously, etc.

In these or other embodiments, logistics system 406 can use geographic information and/or traffic information to use distance calculations to calculate or modify the component estimated fulfillment time interval corresponding to the factor of the conveyance type of the picked sales order. In some embodiments, the geographic information (e.g., maps, mapping tools, etc.) and/or traffic information can be stored at fulfillment site database(s) 501 (FIG. 5) and/or navigation database(s) 503 (FIG. 5), and logistics system 406 can query fulfillment site database(s) 502 (FIG. 5) and/or navigation database(s) 503 via communication system 404 to obtain the geographic information and/or traffic information. For example, fulfillment site database(s) 502 can store geographic information relating to the fulfillment site from where the good(s) of the picked sales order will be collected (e.g., a store, warehouse, or distribution center map), and navigation database(s) 503 can store geographic information (e.g., one or more street maps) and/or traffic information outside of the fulfillment site. Using geographic information and/or traffic information to use distance calculations to calculate or modify the component estimated fulfillment time interval corresponding to the factor of the conveyance type of the picked sales order can improve an accuracy of the component estimated fulfillment time interval corresponding to the factor of the conveyance type of the picked sales order, particularly when the picked sales order is being provided to the customer away from the fulfillment site where the good(s) of the picked sales order are collected.

In many embodiments, logistics system 406 can evaluate an availability of one or more pickers to pick the good(s) of a picked sales order as a factor for estimating the estimated fulfillment time interval, such as, for example, at the location (e.g., brick and mortar store, distribution center, warehouse, etc.) where the good(s) of the picked sales order will be picked by the picker(s). Accordingly, logistics system 406 can calculate a component estimated fulfillment time interval corresponding to the factor of the availability of the picker(s) to pick the good(s) of a picked sales order.

For example, in order to calculate the component estimated fulfillment time interval corresponding to the factor of the availability of the picker(s) to pick the good(s), logistics system 406 can determine how many pickers are currently available to pick the good(s) of the picked sales order, how many previously promised picked sales orders are currently assigned to the picker or pickers, and how many previously promised picked sales orders remain to be assigned to the picker or pickers. Assuming that a given picker can pick only a certain predetermined quantity of picked sales orders per unit of time (e.g., ten picked sales orders per hour), logistics system 406 can calculate the component estimated fulfillment time interval corresponding to the factor of the availability of the picker(s) to pick the good(s) as a function of the quantity of pickers that are currently available to pick the good(s) of the picked sales order, the quantity of previously promised picked sales orders that are currently assigned to the picker(s), and the quantity of previously promised picked sales orders that remain to be assigned to the picker(s).

In some embodiments, logistics system 406 can query shift schedule database(s) 504 (FIG. 5) via communication system 404 to determine how many pickers are currently available to pick the good(s) of the picked sales order. In these embodiments, shift schedule database(s) 504 (FIG. 5) can store shift schedule information of the pickers, identifying the pickers that are currently scheduled to work.

In these or other embodiments, logistics system 406 can query picking assignment database(s) 505 (FIG. 5) via communication system 404 to determine how many previously promised picked sales orders are currently assigned to the picker or pickers, and to determine how many previously promised picked sales orders remain to be assigned to the picker or pickers. In these embodiments, picking assignment database(s) 505 (FIG. 5) can store picking assignment information, identifying how many previously promised picked sales orders are currently assigned to the picker or pickers and how many previously promised picked sales orders remain to be assigned to the picker or pickers.

In further embodiments, logistics system 406 can receive statuses of the pickers from the picker(s) in order to determine how many pickers are currently available to pick the good(s) of the picked sales order, and in some embodiments, to determine how many previously promised picked sales orders remain to be assigned to the picker(s). For example, in some embodiments, a picker can select a status indicating that the picker is available to be assigned a picked sales order (i.e., an available picker status). Further, in some embodiments, a picker can select a status indicating the picker is unavailable to be assigned a picked sales order and that the picked sales orders remaining in the picker's queue will need to be reassigned to one or more other pickers (i.e., a limited wind-down status). Further still, in some embodiments, a picker can select a status indicating the picker is unavailable to be assigned a picked sales order and that the picked sales orders remaining in the picker's queue will be completed by the picker (i.e., a full wind-down status). For example, a picker may select the limited wind-down status when the picker falls ill and needs to stop working immediately. Meanwhile, a picked may select the full wind-down status when the picker's shift is ending. By selecting the wind-down statuses, the picker(s) can notify logistics system 406 to update the quantity of previously promised picked sales orders that remain to be assigned to the picker(s).

In many embodiments, a picker can select a status and provide the status to logistics system 406 using a picker computer system of picker computer system(s) 305 (FIG. 3), and can provide the status to logistics system 406 in real-time. Configuring logistics system 406 to receive picker statuses from the pickers can improve an accuracy of calculating the component estimated fulfillment time interval corresponding to the factor of the availability of the picker(s) to pick the good(s) over determining how many pickers are available by querying shift schedule database(s) 504 (FIG. 5) because pickers may not actually be available despite the shift schedule indicating that the picker is scheduled to work.

In some embodiments, logistics system 406 also can evaluate whether one or more previously promised picked sales orders have been canceled in order to calculate the component estimated fulfillment time interval corresponding to the factor of the availability of the picker(s) to pick the good(s). For example, logistics system 406 can update the quantity of previously promised picked sales orders that remain to be assigned to the picker(s) upon identifying that one or more previously promised picked sales orders have been canceled.

In many embodiments, logistics system 406 can evaluate an availability of one or more packers to pack the good(s) of a picked sales order as a factor for estimating the estimated fulfillment time interval. Accordingly, logistics system 406 can calculate a component estimated fulfillment time interval corresponding to the factor of the availability of the packer(s) to pack the good(s) of a picked sales order. Calculating the component estimated fulfillment time interval corresponding to the factor of the availability of the packer(s) to pack the good(s) of a picked sales order can be similar or identical to calculating the component estimated fulfillment time interval corresponding to the factor of the availability of the picker(s) to pick the good(s) of a picked sales order but with respect to packers rather than pickers.

In many embodiments, logistics system 406 can evaluate whether the picked sales order is able to be batched in a picked sales order batch as a factor for estimating the estimated fulfillment time interval. Accordingly, logistics system 406 can calculate a component estimated fulfillment time interval corresponding to the factor of whether the picked sales order is able to be batched in a picked sales order batch. As used herein, a "picked sales order batch" can refer to a bundle of picked sales orders that are assigned to a picker and for which the picker collects the goods of the picked sales orders in parallel. Picking the goods of a picked sales order can be a cost intensive and manual activity. Accordingly, batching picked sales orders in a picked sales order batch can provide cost and time efficiencies by permitting the goods of the picked sales orders to be collected in parallel.

For example, in order to calculate the component estimated fulfillment time interval corresponding to the factor of whether the picked sales order is able to be batched in a picked sales order batch, logistics system 406 can query picking assignment database(s) 505 (FIG. 5) via communication system 404 to determine which previously promised picked sales orders are currently assigned to which picker or pickers, and to determine how many previously promised picked sales orders remain to be assigned to the picker or pickers. Further, logistics system 406 can determine how many pickers are currently available to pick the goods of the current and previously promised picked sales orders. For example, in many embodiments, logistics system 406 can determine the availability of the pickers as described above with respect to calculating the component estimated fulfillment time interval corresponding to the factor of the availability of the picker(s) to pick the good(s).

Further, logistics system 406 can use a k-means clustering to batch and/or re-batch the current and previously promised picked sales orders into one or more picked sales order batches to minimize a pick walk for the picked sales order batch(es). As used herein, a "pick walk" refers to a path taken by a picker to collect the good(s) of a stand-alone picked sales order or a picked sales order batch, as applicable. For example, logistics system 406 can use a k-means clustering to determine clusters of the goods of the current and previously promised picked sales orders, assigning each good to only one cluster and maximizing a density of the clusters using a Euclidean distance metric. Logistics system 406 can use a solution of the k-means clustering that provides the densest clusters of goods while including all goods of any picked sales orders having goods in the cluster. Further, the number of clusters can be constrained to the quantity of available pickers, and the picked sales orders associated with the clusters can be assigned to the available picker(s) as the picked sales order batch(es). Solutions of the k-means clustering that would result in a previously promised picked sales order not being timely fulfilled as promised are excluded.

Equation 1 provides an exemplary k-means clustering algorithm that can be used to batch and/or re-batch the current and previously promised picked sales orders into one or more picked sales order batches to minimize a pick walk for the picked sales order batch(es):

$$\text{Scatter Cost} = \sum_{K=1}^{K} \sum_{x_i \in C_K} (x_i - M_K)^2, \quad (1)$$

where $C_K$ is a cluster, $M_K$ is the centroid of cluster $C_K$, K=1 K is a total number of K clusters, and $x_i \ldots x_n$ are the points within each cluster $C_K$. In many embodiments, Equation 1 can be solved for a minimum Scatter Cost.

In further embodiments, logistics system 406 can use a Pareto optimization to batch and/or re-batch the current and previously promised picked sales orders into one or more picked sales order batches to maximize tote fill of the picked sales order batches. As used herein, the term "tote fill" refers to the available volume of the totes used by the pickers to collect the goods of picked sales orders. For example, logistics system 406 can use a Pareto optimization of the good(s) of the picked sales order batches in combination with the k-means clustering to further refine the clusters of goods to maximize tote fill while minimizing pick walk. The Pareto optimization can factor the quantity and volume of the totes.

If logistics system 406 determines that the picked sales order will be picked in a picked sales order batch, logistics system 406 can calculate the component estimated fulfillment time interval corresponding to the factor of whether the picked sales order is able to be batched in a picked sales order batch by summing together the estimated fulfillment times of the previously promised picked sales orders in the picked sales order batch with the estimated fulfillment time of the current picked sales order as calculated by one or more of the other factors, reducing the sum value to account for efficiencies resulting from batching the picked sales orders. Meanwhile, if logistics system 406 determines that the picked sales order will be picked by itself, logistics system 406 can calculate the component estimated fulfillment time interval corresponding to the factor of whether the picked sales order is able to be batched in a picked sales order batch as the estimated fulfillment time for the picked sales order as calculated by one or more of the other factors.

In many embodiments, after estimating the estimated fulfillment time interval to make ready the good(s) of the picked sales order for receipt by the customer, logistics system 406 can (i) identify a current clock time and (ii) identify a first available clock time. As used herein, the term "first available clock time" refers to a clock time of one or more predetermined clock times for which a difference of the first available clock time and the current clock time is greater than the estimated fulfillment time interval, and that occurs after the current clock time and nearest to the current clock time. The first available clock time and/or the predetermined clock time(s) can be based on the local time at the location of the customer, at the location where the good(s) are being picked, and/or at the delivery or pick-up location of the good(s).

Further, logistics system 406 can assign the first available clock time as the receivable clock time. In other words, logistics system 406 can assign as the receivable clock time a nearest predetermined clock time by which the good(s) of a picked sales order can timely be made ready for receipt by the customer associated with the picked sales order.

The predetermined clock time(s) implemented for identifying the first available clock time can be established by the operator of system 300 (FIG. 3) or by another entity offering for sale the good(s) of a picked sales order being affected by the delay condition (e.g., a third-party retailer), such as, for example, when the operator of system 300 (FIG. 3) is not offering for sale the good(s) of the picked sales order. Although, in some embodiments, the predetermined clock time(s) can be any suitable times of the day, in many embodiments, the predetermined clock time(s) can be rounded to clock hour or clock half-hour increments to simplify the receivable clock time for the customer. Further, in some embodiments, the predetermined clock time(s) can be limited to a particular window of the day (e.g., an operating window).

Compliance System 407

Compliance system 407 can monitor for and detect one or more delay conditions associated with making ready the good(s) of a picked sales order for receipt by the customer at the receivable clock time after engagement system 405 has promised the good(s) of the picked sales order for receipt by the customer at the receivable clock time. When compliance system 407 detects a delay condition, compliance system 407 can communicate one or more notifications of the delay condition to one or more receiving parties.

In some embodiments, implementing compliance system 407 can help to ensure a picked sales order promised for receipt by the customer at the receivable clock time is timely fulfilled, such as, for example, by notifying one or more entities responsible for making ready the good(s) of a picked sales order for receipt by the customer at the receivable clock time of delays that may prevent timely fulfillment of the picked sales order. In these or other embodiments, implementing compliance system 407 can keep a customer apprised of one or more delays that may affect a picked sales order associated with the customer.

As used herein, the term "delay condition" refers to a condition that may prevent a picked sales order from being ready for receipt by the customer associated with the picked sales order at the receivable clock time. Accordingly, in many embodiments, a delay condition can occur at any stage of the lifecycle of making ready a picked sales order for receipt by a customer associated with the picked sales order at a receivable clock time. Exemplary delay conditions can include (i) a delay in assigning the picked sales order to a picker, (ii) a delay by a picker in beginning to pick the good(s) of a picked sales order, (iii) a delay by a picker in picking the good(s) of a picked sales order after the picker begins picking the good(s) of the picked sales order, (iv) a delay by a packer in beginning to pack the good(s) of a picked sales order, (v) a delay by a packer in packing the good(s) of the picked sales order after the packer begins to pack the good(s) of the picked sales order, (vi) a delay by a deliverer in beginning to deliver to the customer the good(s) of a picked sales order, and (vii) a delay by a deliverer in delivering to the customer the good(s) of a picked sales order after the deliverer begins to deliver the good(s) of the picked sales order.

In some embodiments, compliance system 407 can wait to communicate a notification of a delay condition to a receiving party until the delay condition persists for a predetermined period of time. The predetermined period of time can be established by the operator of system 300 (FIG. 3) or by another entity offering for sale the good(s) of a picked sales order being affected by the delay condition (e.g., a third-party retailer), such as, for example, when the operator of system 300 (FIG. 3) is not offering for sale the good(s) of the picked sales order. Further, the predetermined period of time can be the same or different for two or more delay conditions. In these or other embodiments, compliance system 407 can wait to communicate a notification of a delay condition to a receiving party until a delayed activity associated with the delay condition is delayed by a predetermined percentage of an average time for performing the activity. The predetermined percentage of the average time for performing the activity can be established by the operator of system 300 (FIG. 3) or by another entity offering for sale the good(s) of a picked sales order being affected by the delay condition (e.g., a third-party retailer), such as, for example, when the operator of system 300 (FIG. 3) is not offering for sale the good(s) of the picked sales order. Further, the predetermined percentage of the average time for performing the activity can be the same or different for two or more delay conditions.

In many embodiments, compliance system 407 can communicate notification(s) of delay condition(s) to any suitable receiving party or parties, and can communicate the notification(s) using any suitable media. Exemplary receiving parties can include (i) an entity responsible for performing a delayed activity associated with a delay condition (e.g., a picker, a packer, a deliverer, etc.), (ii) a manager of responsible for performing a delayed activity associated with a delay condition, (iii) an operator of system 300 (FIG. 3), (iv) an entity offering for sale the good(s) of a picked sales order being affected by a delay condition, and (v) a customer associated with a picked sales order being affected by a delay condition. Exemplary media can include (i) a text message, (ii) a telephone call, (iii) an email, (iv) a mobile application notification (e.g., a push notification), and (v) a dashboard visualization generated at an output device (e.g., electronic display) of central computer system 301 (FIG. 3).

In many embodiments, the receiving party or parties that receive a notification of a delay condition and the medium or media and the mode by which the notification of the delay condition is communicated to the receiving party or parties can depend on the urgency of the delay condition(s). Further, when compliance system 407 sends a notification of a delay condition to multiple receiving parties, compliance system 407 can send the notification of the delay condition to the multiple receiving parties in series or parallel. For example, compliance system 407 can communicate a first notification of a delay condition to an entity responsible for performing a delayed activity associated with a delay condition, and then can communicate a second notification of the delay condition to a manager of the entity, such as, for example, if the delay condition is not resolved within a predetermined period of time of compliance system 407 communicating the first notification.

In some embodiments, when compliance system 407 communicates a notification to a picker, compliance system 407 can communicate the notification to the picker at a picker computer system of picked computer system(s) 305 (FIG. 3); when compliance system 407 communicates a notification to a picker, compliance system 407 can communicate the notification to the picker at a picker computer system of picked computer system(s) 305 (FIG. 3); when compliance system 407 communicates a notification to a packer, compliance system 407 can communicate the notification to the packer at a packer computer system of picked computer system(s) 306 (FIG. 3); when compliance system 407 communicates a notification to a deliverer, compliance system 407 can communicate the notification to the deliverer at a deliverer computer system of deliverer computer system(s) 307 (FIG. 3); when compliance system 407 communicates a notification to a manager, compliance system 407 can communicate the notification to the manager at a manager computer system of manager computer system(s) 308 (FIG. 3); when compliance system 407 communicates a notification to the customer, compliance system 407 can communicate the notification to the customer at customer computer system 309 (FIG. 3); and/or when compliance system 407 communicates a notification to the operator, compliance system 407 can communicate the notification to the operator at central computer system 301 (FIG. 3).

In a specific example, when compliance system 407 detects a delay condition of a delay in assigning a picked sales order to a picker, compliance system 407 can communicate a notification of the delay condition to a manager of the picker.

In another specific example, when compliance system 407 detects a delay condition of a delay by a picker in beginning to pick the good(s) of a picked sales order, compliance system 407 can communicate a notification of the delay condition to the picker.

In another specific example, when compliance system 407 detects a delay condition of a delay by a picker in picking the good(s) of a picked sales order after the picker begins picking the good(s) of the picked sales order, compliance system 407 can communicate a notification of the delay condition to the picker.

In another specific example, when compliance system 407 detects a delay condition of a delay by a picker in picking the good(s) of a picked sales order after the picker begins picking the good(s) of the picked sales order, compliance system 407 can communicate a first notification of the delay condition to the picker, and then can communicate a second notification of the delay condition to a manager of the picker.

In another specific example, when compliance system 407 detects a delay condition of a delay by a packer in beginning to pack the good(s) of a picked sales order, compliance system 407 can communicate a notification of the delay condition to the packer.

In another specific example, when compliance system 407 detects a delay condition of a delay by a packer in packing the good(s) of a picked sales order after the picker begins packing the good(s) of the picked sales order, compliance system 407 can communicate a notification of the delay condition to the packer.

In another specific example, when compliance system 407 detects a delay condition of a delay by a packer in packing the good(s) of a picked sales order after the packer begins packing the good(s) of the picked sales order, compliance system 407 can communicate a first notification of the delay condition to the packer, and then can communicate a second notification of the delay condition to a manager of the packer.

In another specific example, when compliance system 407 detects a delay condition of a delay by a deliverer in delivering the good(s) of a picked sales order, compliance system 407 can communicate a notification of the delay condition to the deliverer.

In another specific example, when compliance system 407 detects a delay condition of a delay by a deliverer in delivering the good(s) of a picked sales order after the picker begins delivering the good(s) of the picked sales order, compliance system 407 can communicate a notification of the delay condition to the deliverer.

In another specific example, when compliance system 407 detects a delay condition of a delay by a deliverer in delivering the good(s) of a picked sales order after the deliverer begins delivering the good(s) of the picked sales order, compliance system 407 can communicate a first notification of the delay condition to the deliverer, and then can communicate a second notification of the delay condition to a manager of the deliverer.

Turning now back to FIG. 3, in some embodiments, system 300 can ignore security concerns relating to fulfilling a promised picked sales order. However, in other embodiments, system 300 can consider security concerns when fulfilling a promised picked sales order. For example, system 300 and/or engagement system 405 (FIG. 4) can notify the operator of system 300 (FIG. 3) or, when applicable, another entity offering for sale the good(s) of a picked sales order of the security risks relating to fulfilling the picked sales order.

In some embodiments, system 300 can analyze the sales patterns for goods purchased in conventional sales orders (i.e., customer-picked sales orders) to evaluate cases where goods promised for a picked sales order could not be provided or needed to be substituted because the good(s) were taken from inventory by a customer of a customer-picked sales order. As a result, system 300 can help brick and mortar retailers to implement good planning systems that provide accurate sales forecasts to generate replenishment plans and re-order lifecycles.

In many embodiments, system 300 can advantageously help brick and mortar retailers to build strategies for expedited picked sales orders at their stores in order to use lean periods of their associates in the store and/or to open new channels of revenue. Further, system 300 can accurately incorporate real time fulfillment capacity planning and balancing with a feedback loop to permit accurate and dynamic picked sales order promising and fulfillment for an omni-channel or hyper-local fulfillment based supply chain. Further still, system 300 (FIG. 3) can help brick and mortar stores to find the right balance of the capacity of existing associates in the stores, the demand for expedited picked sales orders, and the price point sufficient to cover the costs of fulfilling picked sales orders. Also, system 300 can balance its operations cost vis-a-vis the cost of providing expedited picked sales orders to customers and pass a part of the cost to the customers. Additionally, system 300 can provide expedited picked sales orders with short and reliable lead times, thereby providing improved customer satisfaction.

Figure 6:
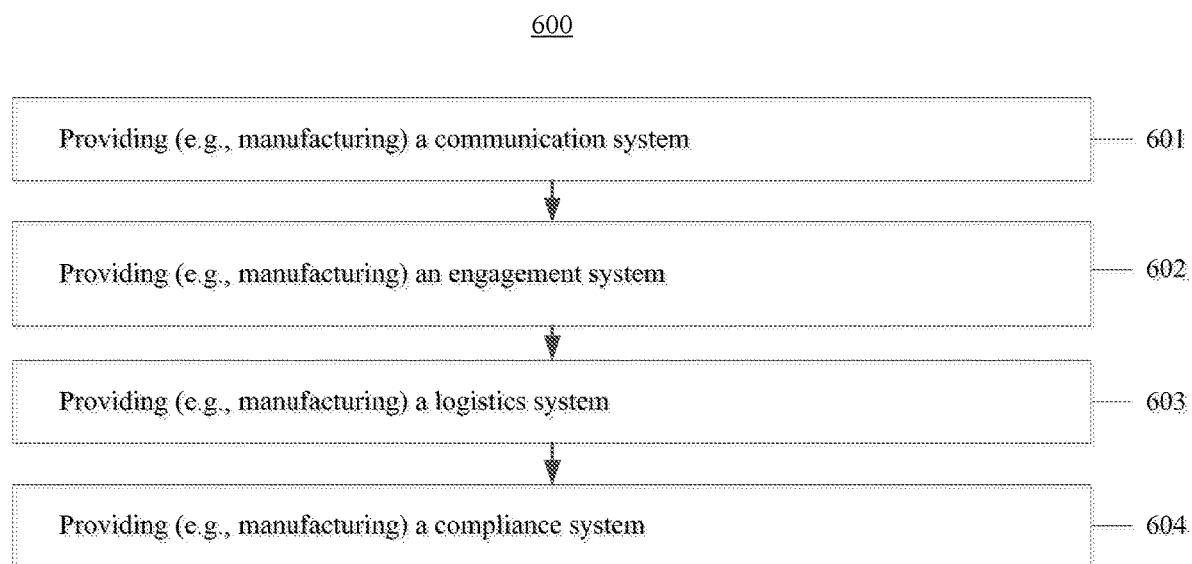
FIG. 6 illustrates a flow chart for a method of providing a system, according to an embodiment.

Turning ahead now in the drawings, FIG. 6 illustrates a flow chart for an embodiment of a method 600 of providing (e.g., manufacturing) a system. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of the method 600 can be performed in any other suitable order. In still other embodiments, one or more of the activities in method 600 can be combined or skipped. In many embodiments, the system can be similar or identical to system 300 (FIG. 3).

In many embodiments, method 600 can comprise activity 601 of providing (e.g., manufacturing) a communication system. In some embodiments, the communication system can be similar or identical to communication system 404 (FIG. 4).

In many embodiments, method 600 can comprise activity 602 of providing (e.g., manufacturing) an engagement system. In some embodiments, the engagement system can be similar or identical to engagement system 405 (FIG. 4).

In many embodiments, method 600 can comprise activity 603 of providing (e.g., manufacturing) a logistics system. In some embodiments, the logistics system can be similar or identical to logistics system 406 (FIG. 4).

In many embodiments, method 600 can comprise activity 604 of providing (e.g., manufacturing) a compliance system. In some embodiments, the compliance system can be similar or identical to compliance system 407 (FIG. 4). In other embodiments, activity 604 can be omitted.

Figure 7:
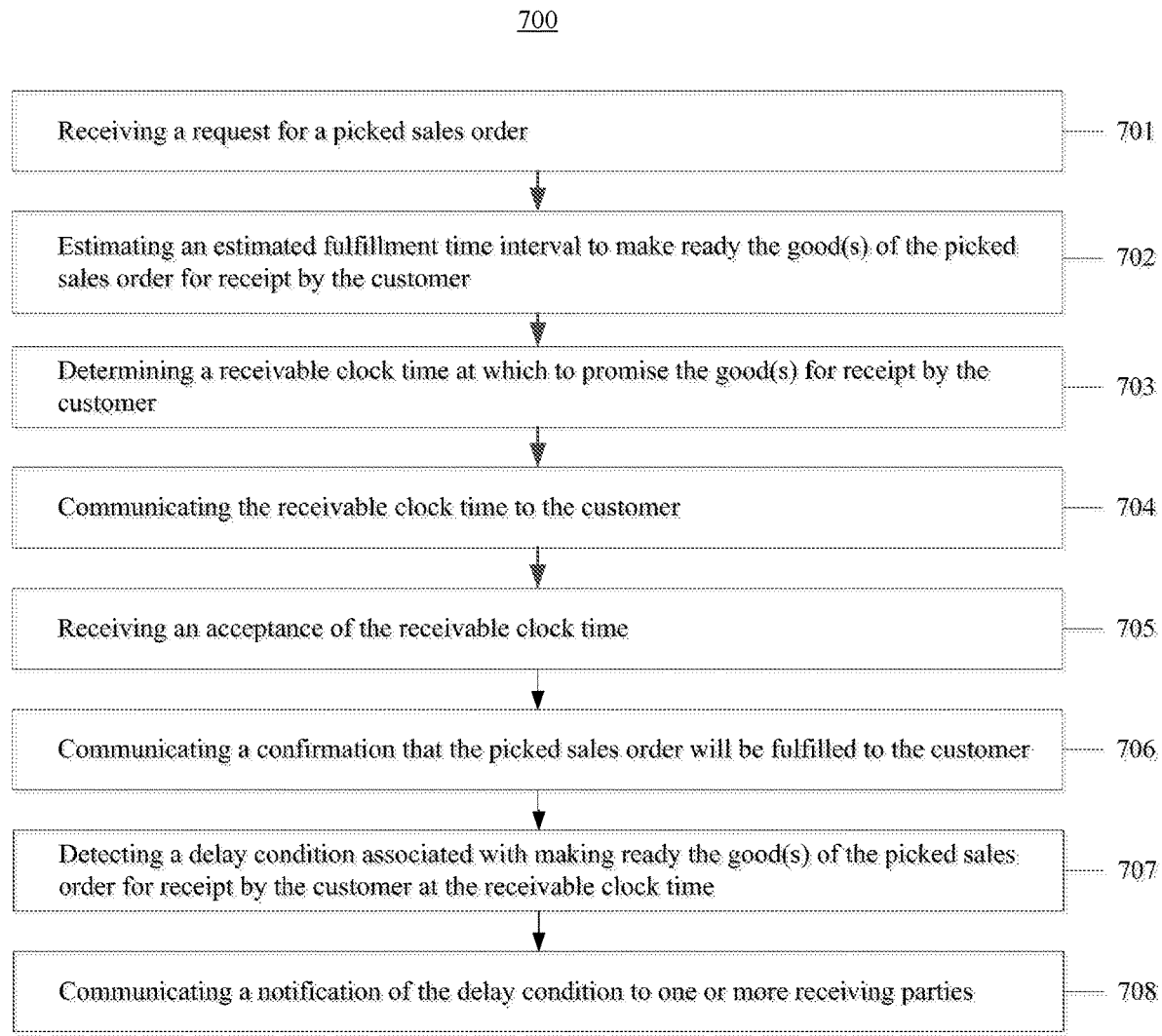
FIG. 7 illustrates a flow chart for an embodiment of a method.

Turning ahead now in the drawings, FIG. 7 illustrates a flow chart for an embodiment of a method 700. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of the method 700 can be performed in any other suitable order. In still other embodiments, one or more of the activities in method 700 can be combined or skipped.

In many embodiments, method 700 can comprise activity 701 of receiving a request for a picked sales order. In some embodiments, performing activity 701 can be similar or identical to receiving a request for a picked sales order as described above with respect to system 300 (FIG. 3) and engagement system 405 (FIG. 4). Further, the request for the picked sales order can be similar or identical to the request for the picked sales order described above with respect to system 300 (FIG. 3), and the picked sales order can be similar or identical to the picked sales order described above with respect to system 300 (FIG. 3). For example, the picked sales order can be associated with a customer, the picked sales order can comprise one or more goods, and the good(s) can be offered for sale.

Figure 8:
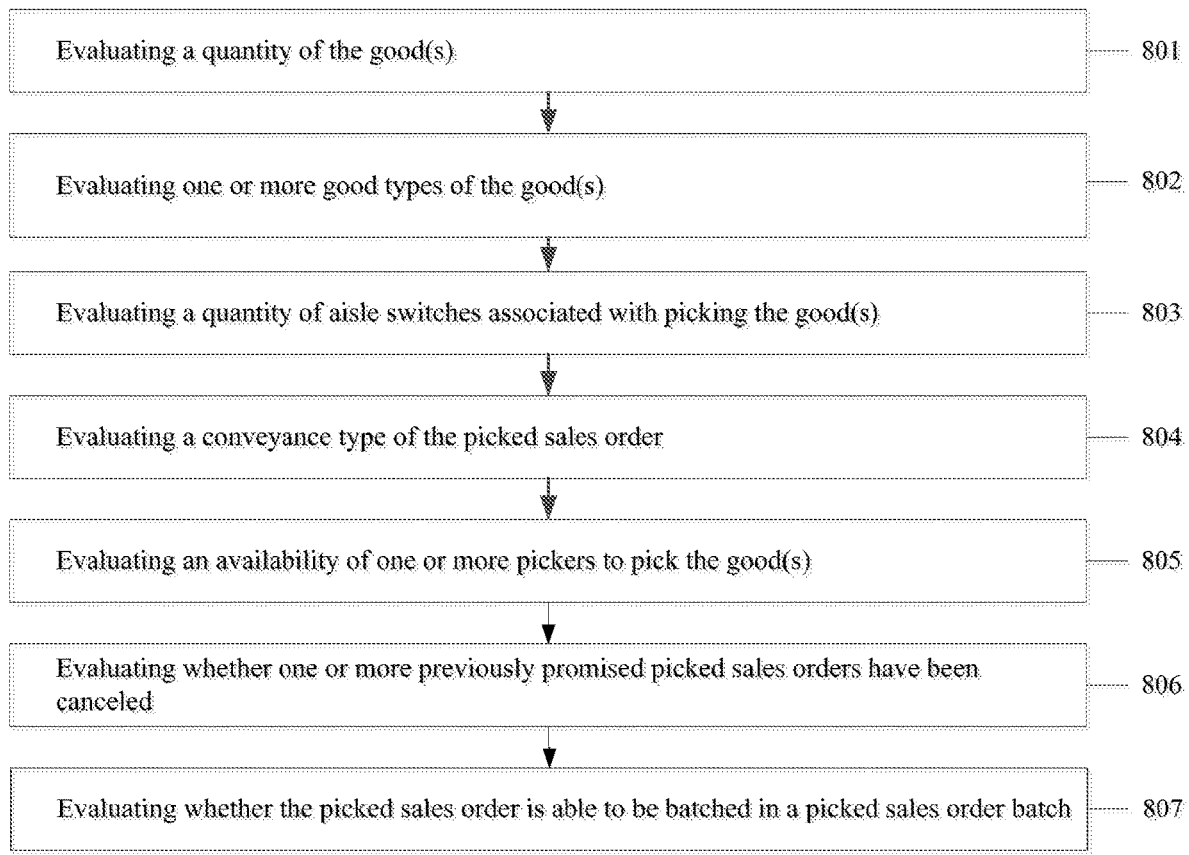
FIG. 8 illustrates an exemplary activity of estimating an estimated fulfillment time interval to make ready the good(s) of a picked sales order for receipt by a customer, according to the embodiment of FIG. 7.

In many embodiments, method 700 can comprise activity 702 of estimating an estimated fulfillment time interval to make ready the good(s) of the picked sales order for receipt by the customer. In some embodiments, performing activity 702 can be similar or identical to estimating an estimated fulfillment time interval to make ready the good(s) of the picked sales order for receipt by the customer as described above with respect to system 300 (FIG. 3) and logistics system 406 (FIG. 4). Further, the estimated fulfillment time interval can be similar or identical to the estimated fulfillment time interval described above with respect to system 300 (FIG. 3). In some embodiments, activity 702 can be performed after activity 701. FIG. 8 illustrates an exemplary activity 702, according to the embodiment of FIG. 7.

For example, in many embodiments, activity 702 can comprise activity 801 of evaluating a quantity of the good(s). In some embodiments, performing activity 801 can be similar or identical to evaluating a quantity of the good(s) as described above with respect to system 300 (FIG. 3) and logistics system 406 (FIG. 4).

In many embodiments, activity 702 can comprise activity 802 of evaluating one or more good types of the good(s). In some embodiments, performing activity 802 can be similar or identical to evaluating one or more good types of the good(s) as described above with respect to system 300 (FIG. 3) and logistics system 406 (FIG. 4). Further, the good type(s) can be similar or identical to the good type(s) described above with respect to system 300 (FIG. 3).

In many embodiments, activity 702 can comprise activity 803 of evaluating a quantity of aisle switches associated with picking the good(s). In some embodiments, performing activity 803 can be similar or identical to evaluating a quantity of aisle switches associated with picking the good (s) as described above with respect to system 300 (FIG. 3) and logistics system 406 (FIG. 4).

In many embodiments, activity 702 can comprise activity 804 of evaluating a conveyance type of the picked sales order. In some embodiments, performing activity 804 can be similar or identical to evaluating a conveyance type of the picked sales order as described above with respect to system 300 (FIG. 3) and logistics system 406 (FIG. 4). Further, the conveyance type can be similar or identical to the conveyance type described above with respect to system 300 (FIG. 3).

Figure 9:
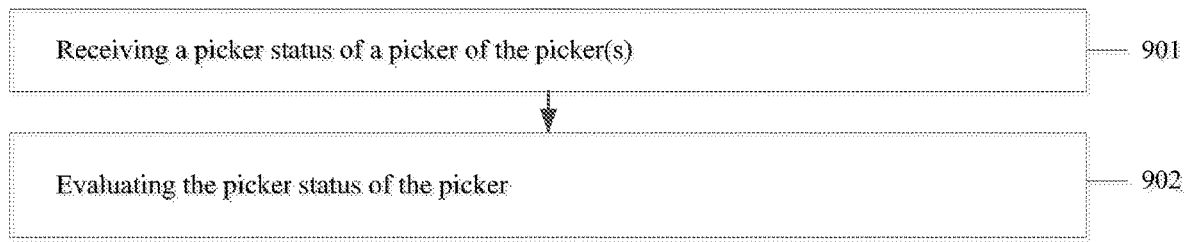
FIG. 9 illustrates an exemplary activity of evaluating an availability of one or more pickers to pick the good(s), according to the embodiment of FIG. 7.

In many embodiments, activity 702 can comprise activity 805 of evaluating an availability of one or more pickers to pick the good(s). In some embodiments, performing activity 805 can be similar or identical to evaluating an availability of one or more pickers to pick the good(s) as described above with respect to system 300 (FIG. 3) and logistics system 406 (FIG. 4). Further, the picker(s) can be similar or identical to the picker(s) as described above with respect to system 300 (FIG. 3). FIG. 9 illustrates an exemplary activity 805, according to the embodiment of FIG. 7.

For example, in many embodiments, activity 805 can comprise activity 901 of receiving a picker status of a picker of the picker(s). In some embodiments, performing activity 901 can be similar or identical to receiving a picker status of a picker of the picker(s) as described above with respect to system 300 (FIG. 3) and logistics system 406 (FIG. 4).

Further, activity 805 can comprise activity 902 of evaluating the picker status of the picker. In some embodiments, performing activity 902 can be similar or identical to evaluating the picker status of the picker as described above with respect to system 300 (FIG. 3) and logistics system 406 (FIG. 4). In some embodiments, activity 902 can be performed after activity 901.

Turning again to FIG. 8, in many embodiments, activity 702 can comprise activity 806 of evaluating whether one or more previously promised picked sales orders have been canceled. In some embodiments, performing activity 806 can be similar or identical to evaluating whether one or more previously promised picked sales orders have been canceled as described above with respect to system 300 (FIG. 3) and logistics system 406 (FIG. 4).

In many embodiments, activity 702 can comprise activity 807 of evaluating whether the picked sales order is able to be batched in a picked sales order batch. In some embodiments, performing activity 807 can be similar or identical to evaluating whether the picked sales order is able to be batched in a picked sales order batch as described above with respect to system 300 (FIG. 3) and logistics system 406 (FIG. 4). For example, performing activity 807 can include using a k-means clustering to minimize a pick walk of the picked sales order batch, and in some embodiments, using a Pareto optimization to maximize a tote fill of the picked sales order batch. Further, picked sales order batch can be similar or identical to the picked sales order batch described above with respect to system 300 (FIG. 3); the tote fill can be similar or identical to the tote fill described above with respect to system 300 (FIG. 3); and/or the pick walk can be similar or identical to the pick walk as described above with respect to system 300 (FIG. 3).

Figure 10:
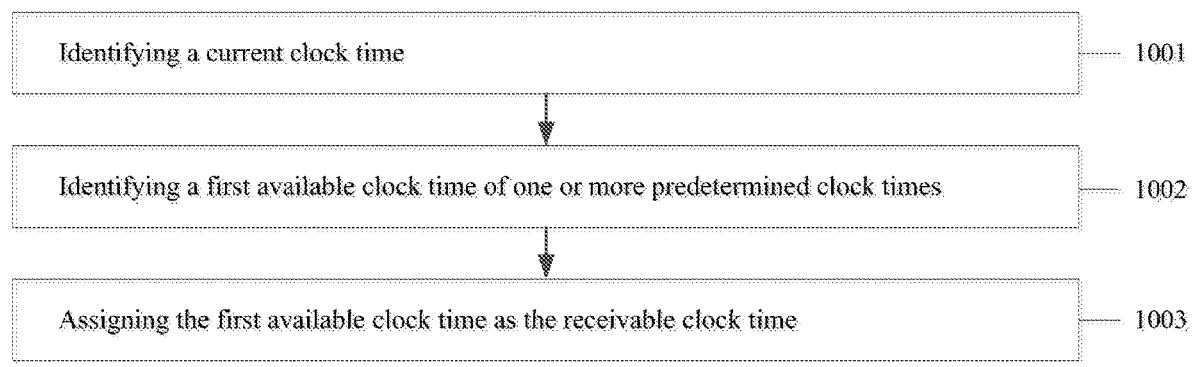
FIG. 10 illustrates an exemplary activity of determining a receivable clock time at which to promise the good(s) for receipt by the customer, according to the embodiment of FIG. 7.

Turning again to FIG. 7, in many embodiments, method 700 can comprise activity 703 of determining a receivable clock time at which to promise the good(s) for receipt by the customer. In some embodiments, performing activity 703 can be similar or identical to determining a receivable clock time at which to promise the good(s) for receipt by the customer as described above with respect to system 300 (FIG. 3) and logistics system 406 (FIG. 4). Further, the receivable clock time can be similar or identical to the receivable clock time described above with respect to system 300 (FIG. 3). In some embodiments, activity 703 can be performed after activity 702. FIG. 10 illustrates an exemplary activity 703, according to the embodiment of FIG. 7.

For example, in many embodiments, activity 703 can comprise activity 1001 of identifying a current clock time. In some embodiments, performing activity 1001 can be similar or identical to identifying a current clock time as described above with respect to system 300 and logistics system 406 (FIG. 4). Further, the current clock time can be similar or identical to the current clock time described above with respect to system 300 (FIG. 3).

In many embodiments, activity 703 can comprise activity 1002 of identifying a first available clock time of one or more predetermined clock times for which a difference of the first available clock time and the current clock time is greater than the estimated fulfillment time interval, and that occurs after the current clock time and nearest to the current clock time. In some embodiments, performing activity 1002 of identifying a first available clock time of one or more predetermined clock times for which a difference of the first available clock time and the current clock time is greater than the estimated fulfillment time interval, and that occurs after the current clock time and nearest to the current clock time. Further, the first available clock time can be similar or identical to the first available clock time described above with respect to system 300 (FIG. 3). In some embodiments, activity 1002 can be performed after or approximately simultaneously with activity 1001.

In many embodiments, activity 703 can comprise activity 1003 of assigning the first available clock time as the receivable clock time. In some embodiments, performing activity 1003 can be similar or identical to assigning the first available clock time as the receivable clock time as described above with respect to system 300 (FIG. 3) and logistics system 406 (FIG. 4). In some embodiments, activity 1003 can be performed after or approximately simultaneously with activity 1001 and activity 1002.

Turning again to FIG. 7, in many embodiments, method 700 can comprise activity 704 of communicating the receivable clock time to the customer. In some embodiments, performing activity 704 can be similar or identical to communicating the receivable clock time to the customer as described above with respect to system 300 (FIG. 3) and engagement system 405 (FIG. 4). In some embodiments, activity 704 can be performed after activities 701-703.

In many embodiments, method 700 can comprise activity 705 of receiving an acceptance of the receivable clock time. In some embodiments, performing activity 705 can be similar or identical to receiving an acceptance of the receivable clock time as described above with respect to system 300 (FIG. 3) and engagement system 405 (FIG. 4). In some embodiments, activity 705 can be performed after activity 704.

In many embodiments, method 700 can comprise activity 706 of communicating a confirmation that the picked sales order will be fulfilled to the customer. In some embodiments, performing activity 706 of communicating a confirmation that the picked sales order will be fulfilled to the customer. In some embodiments, activity 706 can be performed after activity 705.

In some embodiments, method 700 can comprise activity 707 of detecting a delay condition associated with making ready the good(s) of the picked sales order for receipt by the customer at the receivable clock time. In some embodiments, performing activity 707 of detecting a delay condition associated with making ready the good(s) of the picked sales order for receipt by the customer at the receivable clock time. Further, the delay condition can be similar or identical to the delay condition described above with respect to system 300 (FIG. 3).

Further, method 700 can comprise activity 708 of communicating a notification of the delay condition to one or more receiving parties. In some embodiments, performing activity 708 of communicating a notification of the delay condition to one or more receiving parties. Further, the notification can be similar or identical to the notification described above with respect to system 300 (FIG. 3); and the receiving party or parties can be similar or identical to the receiving party or parties described above with respect to system 300 (FIG. 3). In some embodiments, activity 708 can be performed after activity 707.

In some embodiments, activities 702-706 can be repeated one or more times, such as, for example, to determine if the receivable clock time can be updated to an updated receivable clock time. The updated receivable clock time can be similar or identical to the updated receivable clock time described above with respect to system 300 (FIG. 3). In these or other embodiments, activity 707 and activity 708 can be repeated one or more times for one or more additional delay conditions.

Although the invention has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the activities of the methods described herein may include different activities and be performed by many different elements, in many different orders. As another example, the elements within central computer system 301 and/or user computer system(s) 303 in FIG. 3 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory memory storage devices storing computer instructions configured to run on the one or more processors and perform:
receiving a request for a picked sales order comprising a conveyance type, wherein:
the picked sales order is associated with a customer;
the picked sales order comprises one or more goods; and
the one or more goods are being offered for sale;
estimating an estimated fulfillment time interval to make ready the one or more goods of the picked sales order for receipt by the customer by:
evaluating whether the picked sales order is able to be batched in a picked sales order batch using a k-means clustering algorithm that minimizes a pick walk of the picked sales order batch; and
when the picked sales order is able to be batched, evaluating the conveyance type to determine a conveyance type average fulfillment time interval as a function of:
a dispensing capacity of the conveyance type;
a batching ability of the conveyance type; and
an ability of the conveyance type to operate autonomously;
determining a receivable clock time at which to promise the one or more goods for receipt by the customer by:
identifying a current clock time;
identifying a first available clock time of one or more predetermined clock times, wherein:
the first available clock time is a nearest clock time of the one or more predetermined clock times to the current clock time that also satisfies two additional conditions:
(1) a difference of the first available clock time and the current clock time is greater than the estimated fulfillment time interval; and
(2) the first available clock time occurs after the current clock time; and
when the two additional conditions are satisfied, assigning the first available clock time as the receivable clock time; and
communicating the receivable clock time to the customer.

2. The system of claim 1 wherein:
estimating the estimated fulfillment time interval to make ready the one or more goods of the picked sales order for receipt by the customer further comprises:
evaluating a quantity of the one or more goods.

3. The system of claim 1 wherein:
estimating the estimated fulfillment time interval to make ready the one or more goods of the picked sales order for receipt by the customer further comprises:
evaluating one or more good types of the one or more goods.

4. The system of claim 1 wherein:
estimating the estimated fulfillment time interval to make ready the one or more goods of the picked sales order for receipt by the customer further comprises:
evaluating a quantity of aisle switches associated with picking the one or more goods.

5. The system of claim 1 wherein:
estimating the estimated fulfillment time interval to make ready the one or more goods of the picked sales order for receipt by the customer further comprises:
evaluating an availability of one or more pickers to pick the one or more goods.

6. The system of claim 1 wherein:
estimating the estimated fulfillment time interval to make ready the one or more goods of the picked sales order for receipt by the customer further comprises:
evaluating whether one or more previously promised picked sales orders have been canceled.

7. The system of claim 1 wherein:
the one or more predetermined clock times comprise (i) one or more clock hours or (ii) one or more clock half-hours.

8. The system of claim 1 wherein the one or more non-transitory memory storage devices storing the computer instructions are further configured to run on the one or more processors and perform:
after communicating the receivable clock time to the customer, receiving an acceptance of the receivable clock time.

9. A method implemented via execution of computing instructions configured to run at one or more processors and configured to be stored at non-transitory computer-readable media, the method comprising:
receiving a request for a picked sales order comprising a conveyance type, wherein:
the picked sales order is associated with a customer;
the picked sales order comprises one or more goods; and
the one or more goods are being offered for sale;
estimating an estimated fulfillment time interval to make ready the one or more goods of the picked sales order for receipt by the customer by:
evaluating whether the picked sales order is able to be batched in a picked sales order batch using a k-means clustering algorithm that minimizes a pick walk of the picked sales order batch; and
when the picked sales order is able to be batched, evaluating the conveyance type to determine a conveyance type average fulfillment time interval as a function of:
a dispensing capacity of the conveyance type;
a batching ability of the conveyance type; and
an ability of the conveyance type to operate autonomously;
determining a receivable clock time at which to promise the one or more goods for receipt by the customer by:
identifying a current clock time;
identifying a first available clock time of one or more predetermined clock times, wherein:
the first available clock time is a nearest clock time of the one or more predetermined clock times to the current clock time that also satisfies two additional conditions:
(1) a difference of the first available clock time and the current clock time is greater than the estimated fulfillment time interval; and
(2) the first available clock time occurs after the current clock time; and
when the two additional conditions are satisfied, assigning the first available clock time as the receivable clock time; and
communicating the receivable clock time to the customer.

10. The method of claim 9 wherein:
estimating the estimated fulfillment time interval to make ready the one or more goods of the picked sales order for receipt by the customer further comprises:
evaluating a quantity of the one or more goods.

11. The method of claim 9 wherein:
estimating the estimated fulfillment time interval to make ready the one or more goods of the picked sales order for receipt by the customer further comprises:
evaluating one or more good types of the one or more goods.

12. The method of claim 9 wherein:
estimating the estimated fulfillment time interval to make ready the one or more goods of the picked sales order for receipt by the customer further comprises:
evaluating a quantity of aisle switches associated with picking the one or more goods.

13. The method of claim 9 wherein:
estimating the estimated fulfillment time interval to make ready the one or more goods of the picked sales order for receipt by the customer further comprises:
evaluating an availability of one or more pickers to pick the one or more goods.

14. The method of claim 9 wherein:
estimating the estimated fulfillment time interval to make ready the one or more goods of the picked sales order for receipt by the customer further comprises:
evaluating whether one or more previously promised picked sales orders have been canceled.

15. The method of claim 9 wherein:
the one or more predetermined clock times comprise (i) one or more clock hours or (ii) one or more clock half-hours.

16. The method of claim 9 further comprising:
after communicating the receivable clock time to the customer, receiving an acceptance of the receivable clock time.

17. A system comprising:
one or more processors; and
one or more non-transitory memory storage devices storing computer instructions configured to run on the one or more processors and perform:
receiving a request for a picked sales order, wherein:
the picked sales order is associated with a customer;
the picked sales order comprises one or more goods; and
the one or more goods are being offered for sale;
estimating an estimated fulfillment time interval to make ready the one or more goods of the picked sales order for receipt by the customer by evaluating whether the picked sales order is able to be batched in a picked sales order batch using (i) a k-means clustering algorithm that minimizes a pick walk of the picked sales order batch and (ii) a Pareto optimization algorithm that maximizes a tote fill of the picked sales order batch;
determining a receivable clock time at which to promise the one or more goods for receipt by the customer by:
identifying a current clock time;
identifying a first available clock time of one or more predetermined clock times, wherein:
the first available clock time is a nearest clock time of the one or more predetermined clock times to the current clock time that also satisfies two additional conditions:
(1) a difference of the first available clock time and the current clock time is greater than the estimated fulfillment time interval; and
(2) the first available clock time occurs after the current clock time; and when the two additional conditions are satisfied, assigning the first available clock time as the receivable clock time; and communicating the receivable clock time to the customer.

18. The system of claim 17 wherein:

the request for the picked sales order comprises a conveyance type of the picked sales order; and estimating the estimated fulfillment time interval to make ready the one or more goods of the picked sales order for receipt by the customer further comprises:

evaluating a quantity of the one or more goods;

evaluating one or more good types of the one or more goods;

evaluating a quantity of aisle switches associated with picking the one or more goods;

evaluating a quantity of pickers available to pick the one or more goods;

evaluating the conveyance type of the picked sales order; and evaluating whether one or more previously promised picked sales orders have been canceled.

19. The system of claim 17, wherein:

the one or more predetermined clock times comprise (i) one or more clock hours or (ii) one or more clock half-hours.

20. The system of claim 17, wherein the one or more non-transitory memory storage devices storing the computer instructions are further configured to run on the one or more processors and perform:

after communicating the receivable clock time to the customer, receiving an acceptance of the receivable clock time.

* * * * *